(12) United States Patent
Shi et al.

(10) Patent No.: US 10,336,628 B2
(45) Date of Patent: Jul. 2, 2019

(54) CATALYTIC FAST PYROLYSIS PROCESS WITH IMPURITY REMOVAL

(71) Applicant: Anellotech, Inc., Pearl River, NY (US)

(72) Inventors: Jian Shi, Pearl River, NY (US); Charles Sorensen, Haverstraw, NY (US); Terry Mazanec, Solon, OH (US); Ruozhi Song, Maple Valley, WA (US); Sandeep Goud, Stamford, CT (US); Scott Han, Lawrenceville, NJ (US); Yu-Ting Cheng, Nanuet, NY (US); Victoria L. Frank, Bayside, NY (US); William F. Igoe, Jr., Wilton, ME (US); Marc Schneidkraut, New York, NY (US)

(73) Assignee: ANELLOTECH, INC., Pearl River, NY (US)

( * ) Notice: Subject to any disclaimer, the term of this patent is extended or adjusted under 35 U.S.C. 154(b) by 374 days.

(21) Appl. No.: 15/189,835

(22) Filed: Jun. 22, 2016

(65) Prior Publication Data

US 2017/0002270 A1    Jan. 5, 2017

Related U.S. Application Data

(60) Provisional application No. 62/186,513, filed on Jun. 30, 2015.

(51) Int. Cl.
*C02F 1/42*    (2006.01)
*C02F 9/00*    (2006.01)
(Continued)

(52) U.S. Cl.
CPC .............. *C02F 1/42* (2013.01); *C02F 9/00* (2013.01); *C10B 49/22* (2013.01); *C10B 53/02* (2013.01);
(Continued)

(58) Field of Classification Search
CPC .... C02F 1/04; C02F 1/42; C02F 1/441; C02F 9/00; C02F 11/10; C10B 49/22;
(Continued)

(56) References Cited

U.S. PATENT DOCUMENTS 5,123,962 A    6/1992  Komuro et al.
5,395,455 A    3/1995  Scott et al.
(Continued)

OTHER PUBLICATIONS

Gordon, A.J. et al. (1972) The Chemist's Companion: A Handbook of Practical Data, Techniques, and References, 1st ed., Wiley, 560 pgs [Office action cites pp. 25 and 28].*
(Continued)

*Primary Examiner* — Brian A McCaig
(74) *Attorney, Agent, or Firm* — Roberts Mlotkowski Safran Cole & Calderon P.C.

(57) ABSTRACT

The present invention provides an improved catalytic fast pyrolysis process for increased yield of useful and desirable products. In particular, the process comprises an improved catalytic fast pyrolysis process for producing aromatic compounds, such as, for example, benzene, toluene and xylenes, from biomass feedstock containing impurities, such as, for example alkali and alkaline earth metal, sulfur and nitrogen components.

61 Claims, 5 Drawing Sheets

(51) Int. Cl.

| | | |
|---|---|---|
| *C10B 49/22* | (2006.01) | |
| *C10B 53/02* | (2006.01) | |
| *C10B 57/06* | (2006.01) | |
| *C10B 57/08* | (2006.01) | |
| *C10G 1/02* | (2006.01) | |
| *C10G 1/00* | (2006.01) | |
| C02F 1/04 | (2006.01) | |
| C02F 1/44 | (2006.01) | |
| C02F 11/10 | (2006.01) | |
| C02F 101/10 | (2006.01) | |
| C02F 101/12 | (2006.01) | |
| C02F 101/16 | (2006.01) | |

(52) U.S. Cl.
CPC ............... *C10B 57/06* (2013.01); *C10B 57/08* (2013.01); *C10G 1/002* (2013.01); *C10G 1/02* (2013.01); *C02F 1/04* (2013.01); *C02F 1/441* (2013.01); *C02F 11/10* (2013.01); *C02F 2101/10* (2013.01); *C02F 2101/101* (2013.01); *C02F 2101/12* (2013.01); *C02F 2101/16* (2013.01); *C02F 2303/10* (2013.01); *C02F 2303/18* (2013.01); *C02F 2303/26* (2013.01); *C10G 2300/1014* (2013.01); *Y02E 50/14* (2013.01); *Y02P 20/145* (2015.11); *Y02P 30/20* (2015.11); *Y02W 10/30* (2015.05)

(58) Field of Classification Search
CPC ......... C10B 53/02; C10B 57/06; C10B 57/08; C10G 1/002; C10G 1/02; Y02W 10/30
See application file for complete search history.

(56) References Cited

U.S. PATENT DOCUMENTS

| | | |
|---|---|---|
| 5,865,898 A | 2/1999 | Holtzapple et al. |
| 5,997,613 A | 12/1999 | Kaneko et al. |
| 7,503,981 B2 | 3/2009 | Wyman et al. |
| 8,022,260 B2 | 9/2011 | O'Connor et al. |
| 8,168,840 B2 | 5/2012 | Brady et al. |
| 8,940,060 B2 | 1/2015 | Baird et al. |
| 2006/0188965 A1 | 8/2006 | Wyman et al. |
| 2011/0154270 A1 | 6/2011 | Bartek et al. |
| 2012/0301928 A1 | 11/2012 | Bae et al. |
| 2013/0023706 A1 | 1/2013 | Huber et al. |
| 2013/0340746 A1 | 12/2013 | Kuzhiyil et al. |
| 2014/0161689 A1 | 6/2014 | Chheda et al. |
| 2014/0209261 A1 | 7/2014 | Fougere et al. |
| 2015/0165490 A1 | 6/2015 | Powell et al. |

OTHER PUBLICATIONS

Kristiani A et al.—Effect of pretreatment process by using diluted acid to characteristic of oil 65 palm's frond Energy Procedla. 2013. vol. 32; abstract.

Woolcock, PJ—Development and application or a rapid sampling technique for identification and quantification or compounds in high temperature process gas streams produced from biomass gasification and pyrolysis. Dissertation Iowa State University. 2013; p. 24, first paragraph to third paragraph; p. 53. second paragraph.

International Search Report and Written Opinion issued in the corresponding application PCT/US2016/038770 dated Sep. 19, 2016.

V. Paasikallio, C. Lindfors, E. Kuoppala, Y. Solantausta, A. Oasmaa "Experiences from an extended catalytic fast pyrolysis production run", Green Chem., 2014,16,3549-3559.

Oudenhoven et al "Demineralization of Wood Using Wood-Derived Acid: Towards a Selective Pyrolysis Process for Fuel and Chemicals Production" J Anal Appl Pyrolysis 103 (2013) 112-118.

Kasparbauer, PhD, "The Effects of Biomass Pretreatments on the Products of Fast Pyrolysis" (2009), Graduate Theses and Dissertations, Paper 10064 at Iowa State University, p. 127.

Wang et al, "The deleterious effect of inorganic salts on hydrocarbon yields from catalytic pyrolysis of lignocellulosic biomass and its mitigation", Applied Energy 148 (2015) 115-120.

Lundquist et al, "Removal of Nonprocess Elements From Hardwood Chips Prior to Kraft Cooking," presented at the 59th Appita Conference, May 16-19, 2005, in Auckland, New Zealand.

* cited by examiner

CATALYTIC FAST PYROLYSIS PROCESS WITH IMPURITY REMOVAL

FIELD OF THE INVENTION

The present invention relates to an improved catalytic fast pyrolysis process. In particular, it relates to an improved catalytic fast pyrolysis process for producing aromatic compounds, such as, for example, benzene, toluene and xylenes, from biomass containing impurities, such as alkali and alkaline earth metal, sulfur and nitrogen components.

BACKGROUND OF THE INVENTION

Obtaining useful chemicals, fuels, and energy from renewable biomass represents an important challenge as conventional fossil sources of these materials are slowly depleted. Lignocellulosic biomass is being studied widely as a viable feedstock for renewable liquid biofuels and chemicals because of its low cost and global availability. Biomass-derived fuels and chemicals are projected to substantially reduce net $CO_2$ emissions as well, if produced with minimal use of fossil fuels.

To meet this challenge, there have been extensive efforts to convert biomass to fuels and other useful chemicals. Producing fuels and chemicals from biomass requires specialized conversion processes different from conventional petroleum-based conversion processes due to the nature of the feedstock and products. High temperatures, solid feed, high concentrations of water, unusual separations, contaminants, and oxygenated by-products are some of the features of biomass conversion that are distinct from those encountered in petroleum upgrading. Thus, there are many challenges that must be overcome to efficiently produce chemicals from biomass.

Lignocellulosic biomass (wood, grasses, agricultural residues, etc.) is an alternative, renewable, and sustainable source of feed with significant potential to address the increasing demands for alternative liquid fuels and 'green' chemicals. These feedstocks do not directly compete with the food supply, but have limited utility due to their inherent characteristics and storage limitations. Feedstock supply and the logistics of lignocellulosic biomass upgrading are challenging due to the low bulk density, low energy density, and high ash content of the feed. The chemical and physical inconsistencies of feedstocks are substantial barriers that limit the ability of designing a single, widely applicable process for the upgrading of biomass to fuels and chemicals.

Biomass materials generally comprise cellulose (35%-60%), hemicellulose (15%-40%) and lignin (10%-40%) as major components, a variety of lesser organic materials, water, and some mineral or metallic elements. A range of biomass derived materials can be pyrolyzed to produce mixtures of hydrocarbons, oxygenates, CO, $CO_2$, water, char, coke, and other products. A particularly desirable form of pyrolysis is known as catalytic fast pyrolysis (CFP) that involves the conversion of biomass in a fluid bed reactor in the presence of a catalyst. The catalyst is usually an acidic, microporous crystalline material, usually a zeolite. The zeolite is active for the upgrading of the primary pyrolysis products of biomass decomposition, and converts them to aromatics, olefins, CO, $CO_2$, char, coke, water, and other useful materials. The aromatics include benzene, toluene, xylenes, (collectively BTX), and naphthalene, among other aromatics. The olefins include ethylene, propylene, and lesser amounts of higher molecular weight olefins. BTX aromatics are desirable products due to their high value and ease of transport.

The minerals or metallic elements present as contaminants in biomass, sometimes collectively referred to as alkali and alkaline earth elements (AAEMs) although they may contain many other elements, present a challenge to catalytic processes. These elements can deactivate the catalyst or interfere with the smooth operation of a CFP process by a number of mechanisms. It is thus desirable to limit the amount of the AAEMs that are introduced into the CFP process, or remove the AAEMs, or both, in order to provide a commercially viable process for upgrading biomass to fuels and chemicals. Other impurity elements, primarily sulfur and nitrogen, present in biomass are also detrimental to the conversion of biomass to useful chemicals and fuels. Sulfur and nitrogen can inhibit catalyst activity, complicate product purification, and contaminate effluent streams. Processes for removing sulfur and nitrogen are also needed. The present invention addresses methods to reduce impurities including the AAEMs and sulfur and nitrogen in biomass feed to a CFP process.

In U.S. Pat. No. 8,022,260, a process is described that utilizes an activating step of introducing an additive to make a biomass more susceptible to conversion, and then converting the activated biomass to a product comprising bio-oil. Magnesium and aluminum salts are introduced into the biomass in a wet milling step in one example.

U.S. Patent Application Publication 2013/0340746 describes a process for converting AAEMs present in biomass into thermally stable, catalytically inert salts using hydrochloric, sulfuric, or phosphoric acids in preparation for a biomass pyrolysis process.

In U.S. Pat. No. 8,168,840, a process is described comprising: (i) swelling biomass with a solvent, optionally aided by pH control, application of mechanical action, the incorporation of additive(s), and temperature control; (ii) removing solvent from the swollen solid biomass material by applying mechanical action to the solid biomass material to form a solid modified lignocellulosic biomass material having an increased bulk porosity; and (iii) subjecting the solid modified lignocellulosic biomass material to enzymatic hydrolysis, thermoconversion, or combinations thereof. Optionally the material can be modified by incorporation of a soluble catalyst before it is upgraded. Catalytically upgrading of the swollen, modified, and dried biomass in a fixed or fluid bed of solid catalyst is not discussed.

In U. S. Patent Application Publication 2012/0301928, a method is described for pretreating lignocellulosic biomass prior to hydrolysis, comprising: immersing lignocellulosic biomass in water to swell the biomass; wet-milling the swelled biomass; and popping the wet-milled biomass. Neither minerals removal nor catalytic pyrolysis is mentioned. In U.S. Patent Application Publication 2014/0161689, a process is described for digesting biomass to remove sulfur or nitrogen compounds, reforming the resulting solution with a soluble catalyst to form oxygenate compounds, and then catalytically producing a liquid fuel from the reformed solution. In U.S. Pat. No. 8,940,060, a method is described for forming a pyrolysis oil wherein the feed biomass is washed with a portion of the pyrolysis condensate to produce a washed biomass having a reduced level of metals, and thermally pyrolyzing the washed biomass. Catalytic reaction is not discussed.

Experimental results have been presented (see V. Paasikallio, C. Lindfors, E. Kuoppala, Y. Solantausta, A. Oasmaa, "Experiences from an extended catalytic fast pyrolysis production run", Green Chem., 2014, 16, 3549-3559) in which the amount of 'Alkalis' deposition as a function of time on stream in a CFP process showed a linear increase with time. 'Alkalis' are defined to include K, Ca, Mg, and P. After a four day test of pine sawdust catalytic fast pyrolysis with H-ZSM-5 catalyst, the catalyst had accumulated 1.1 weight % of the 'alkali metals' including K, Ca, Mg, and P. The acidity of the catalyst decreased and the O/C ratio of the produced bio-oil increased, which were interpreted to indicate a reduction of catalytic activity. No attempts to remove alkali metals from the feed or from the process were discussed.

Oudenhoven et al in "Demineralization Of Wood Using Wood-Derived Acid: Towards a Selective Pyrolysis Process for Fuel and Chemicals Production" J Anal Appl Pyrolysis 103 (2013) 112-118, describe the use of a raw pyrolysis water product phase to wash biomass prior to a thermal pyrolysis. Increased yields of bio-oil rich in oxygenated products, i.e. levoglucosan, are reported for the washed wood experiments. Catalytic pyrolysis or the production of aromatics was not discussed. By contrast, Kasparbauer in his PhD thesis entitled "The effects of biomass pretreatments on the products of fast pyrolysis" (2009), Graduate Theses and Dissertations, Paper 10064 at Iowa State University, concludes on page 127 that: "The water wash pretreatment showed no significant difference when compared to unwashed biomass in terms of product yields."

It has been often reported that improved yields of useful products are obtained when AAEMs are introduced into, or not removed from, biomass. U.S. Pat. No. 5,865,898 describes a process for "pretreating a lignocellulose-containing biomass comprising the steps of adding calcium oxide or hydroxide and water and an oxidizing agent to the biomass" to obtain better yields of sugars, ketones, fatty acids, and alcohols.

Wang et al have reported that AAEMs reduce the yields of aromatics and olefins in ex situ catalyzed pyrolysis reactions in "The deleterious effect of inorganic salts on hydrocarbon yields from catalytic pyrolysis of lignocellulosic biomass and its mitigation", Applied Energy 148 (2015) 115-120. Their studies used separate pyrolysis and catalytic upgrading reactors to show that pretreatment of the AAEM-infused cellulose can improve aromatics and olefins yields. No attempts were made to react biomass in the presence of a catalyst in a single reactor.

Among other methods of pretreating biomass, wet milling of corn is routinely used in the industry to separate the various components. Typically the hemicellulose and cellulose are hydrolyzed for further upgrading to ethanol or other products. Wet milling is not used for minerals removal. As it is applied in extracting sugars from corn, wet-milling is a process in which feed material is steeped in water, with or without sulfur dioxide, to soften the seed kernel in order to help separate the kernel's various components. The hydrolysis of the hemicellulose and cellulose is detrimental for a feed that will be upgraded by the CFP process of the present invention.

U.S. Pat. No. 7,503,981 teaches the removal of minerals from biomass as part of a biomass saccharification process that produces dimeric and monomeric saccharides (sugars) from cellulose and hemicellulose using sulfuric acid.

Pretreatment of biomass has been developed broadly for the production of monomeric sugars as precursors in fermentation processes to produce ethanol. These pretreatment processes are optimized for the hydrolytic deconstruction of cellulose and hemicellulose, separation of lignin, and the removal of contaminant materials to provide a sugar rich solution for fermentation. For a catalytic fast pyrolysis process in which all of the cellulose, hemicellulose, and lignin contribute to the yield of valuable materials such as BTX, the processes adapted for ethanol are not applicable since in the production and separation of the sugars a very significant amount of organic material is lost in the lignin and other minor components. The yields of BTX obtainable from these deconstructed feeds in a CFP process are fundamentally limited by the loss of carbon.

Conversion of wood or other cellulosic feedstocks into paper has been commercial for more than a hundred years. The Kraft process is the dominant process used to convert wood into wood pulp, which consists of almost pure cellulose fibers. Wood pretreatment processes have been developed to improve the quality of the wood pulp obtained in the subsequent Kraft process. For example, Lundquist et al in "Removal of Nonprocess Elements From Hardwood Chips Prior to Kraft Cooking," presented at the 59th Appita Conference, 16-19 May 2005, in Auckland, New Zealand, reported that a 24-hour acid leaching of birch or eucalyptus chips in sulfuric acid solution of pH 2.5 at room temperature (22° C.) resulted in thorough removal of K ions and partial removal of Ca ions. However, the extremely long leaching times required make the process unacceptable for large scale, continuous or semi-continuous manufacture of chemicals such as BTX.

In light of current commercial practices and the disclosures of art, a simple, economical, rapid process for enhancing production of aromatic compounds, such as, for example, benzene, toluene and xylenes, from a catalytic pyrolysis process utilizing biomass containing impurities such as alkali and alkaline earth metal components, sulfur compounds and/or nitrogen compounds is needed. The present invention provides such a process.

SUMMARY OF THE INVENTION

Aspects of the present invention include increased yield of useful and desirable benzene, toluene and xylene products in a CFP process utilizing biomass containing alkali and alkaline earth metal components. The present invention provides for this in an economical improved process. An embodiment of the present process comprises the steps of: a) treating biomass containing alkali and alkaline earth metal components, for example, biomass containing at least 500 ppm alkali and alkaline earth metal components, to reduce alkali and alkaline earth metal content to result in treated biomass, b) feeding the treated biomass of step a), catalyst composition, such as one comprising a crystalline molecular sieve characterized by pores with an average pore size from about 5.0 to about 6.5 Angstroms (Å), a silica/alumina mole ratio (SAR) greater than 5 and a Constraint Index (CI) from 1 to 12, and transport fluid to a CFP process fluidized bed reactor maintained at reaction conditions to manufacture a raw fluid product stream, c) feeding the raw fluid product stream of step b) to a solids separation and stripping system to produce separated solids and a fluid product stream, d) feeding the fluid product stream of step c) to a vapor/liquid separation system to produce a liquid phase stream comprising components selected from the group consisting of water, char, coke, ash, catalyst fines, water soluble organics and heavy organics, and combinations thereof, and a vapor phase stream comprising benzene, toluene, xylenes, olefins having carbon numbers of 2 to 4, methane, carbon monoxide, and carbon dioxide, and e) feeding the vapor phase stream of step d) to a product recovery system to recover benzene, toluene, xylenes and optionally olefins. In some embodiments the process includes optional step f) recycling at least a portion of the recovered olefins or toluene of step e) to the fluidized bed reactor of step b).

Another embodiment of the present invention comprises such process wherein treating step a) comprises steps 1) sizing the biomass to ≤20 cm size (particle size is defined as the longest dimension of a particle), for example from 0.1 to 2.0 cm size, particles, 2) washing the biomass with a washing fluid, for example a fluid selected from the group consisting of water, acidified water, alkaline water, and combinations thereof, sufficiently to reduce the content of alkali and alkaline earth metals, 3) optionally rinsing the washed biomass of step 2) with rinsing fluid, 4) drying the biomass to reduce water content, and optionally, 5) reducing the dried particle size to ≤1 cm.

Another embodiment of the present invention comprises such process wherein the washing fluid of step 2) comprises an aqueous solution of organic acids or mineral acids such as acetic acid, formic acid, nitric acid, carbonic acid, carboxylic acid, sulfuric acid, phosphoric acid, or hydrochloric acid, ammonium salt, alkyl ammonium salt, aryl ammonium salt, polyol, or partially liquefied carbon dioxide, or ammonia, or combinations thereof.

Another embodiment of the present invention comprises such process wherein the crystalline molecular sieve of the catalyst of step b) has a structure of ZSM-5, ZSM-11, ZSM-12, ZSM-22, ZSM-23, ZSM-35, ZSM-38, ZSM-48, ZSM-50, zeolite beta, mordenite, or ferrierite, or combinations thereof.

Another embodiment of the invention process comprises such process wherein the crystalline molecular sieve of the catalyst of step b) is characterized by an SAR from greater than 5 to 240 and a CI from 5 to 10, such as a crystalline molecular sieve selected from those having the structure of ZSM-5, ZSM-11, ZSM-22, ZSM-23 or combinations thereof.

Another embodiment of the invention process comprises the steps of: a) treating biomass containing at least 500 ppm alkali and alkaline earth metal components to reduce alkali and alkaline earth metal content to result in treated biomass by a method comprising steps 1) sizing the biomass to ≤20 cm size, for example from 0.1 to 2.0 cm size, particles, 2) washing the biomass with a washing fluid, for example a fluid selected from the group consisting of water, acidified water, alkaline water, and combinations thereof, sufficiently to reduce the content of alkali and alkaline earth metals, 3) optionally rinsing the washed biomass of step 2) with rinsing fluid, 4) drying the biomass to reduce water content, and optionally, 5) reducing the dried particle size to ≤1 cm, b) feeding the treated biomass of step a), catalyst composition comprising a crystalline molecular sieve having the structure of ZSM-5, and transport fluid to a CFP process fluidized bed reactor maintained at reaction conditions including a temperature from 300 to 1000° C. and pressure from 100 to 1500 kPa to manufacture a raw fluid product stream, c) feeding the raw fluid product stream of step b) to a catalyst separation and stripping system to produce separated catalyst and a fluid product stream, d) feeding the fluid product stream of step c) to a vapor/liquid separation system to produce a liquid phase stream comprising components selected from the group consisting of water, char, coke, ash, catalyst fines, water soluble organics and heavy organics, and combinations thereof, and a vapor phase stream comprising benzene, toluene, xylenes, olefins having carbon numbers of 2 to 4, methane, carbon monoxide, and carbon dioxide, e) feeding the vapor phase stream of step d) to a product recovery system to recover benzene, toluene, xylenes, and optionally olefins, and, optionally, f) recycling from about 5 to about 99% of the recovered olefins or toluene of step e) to the fluidized bed reactor of step b).

DETAILED DESCRIPTION OF THE INVENTION

Figure 1:
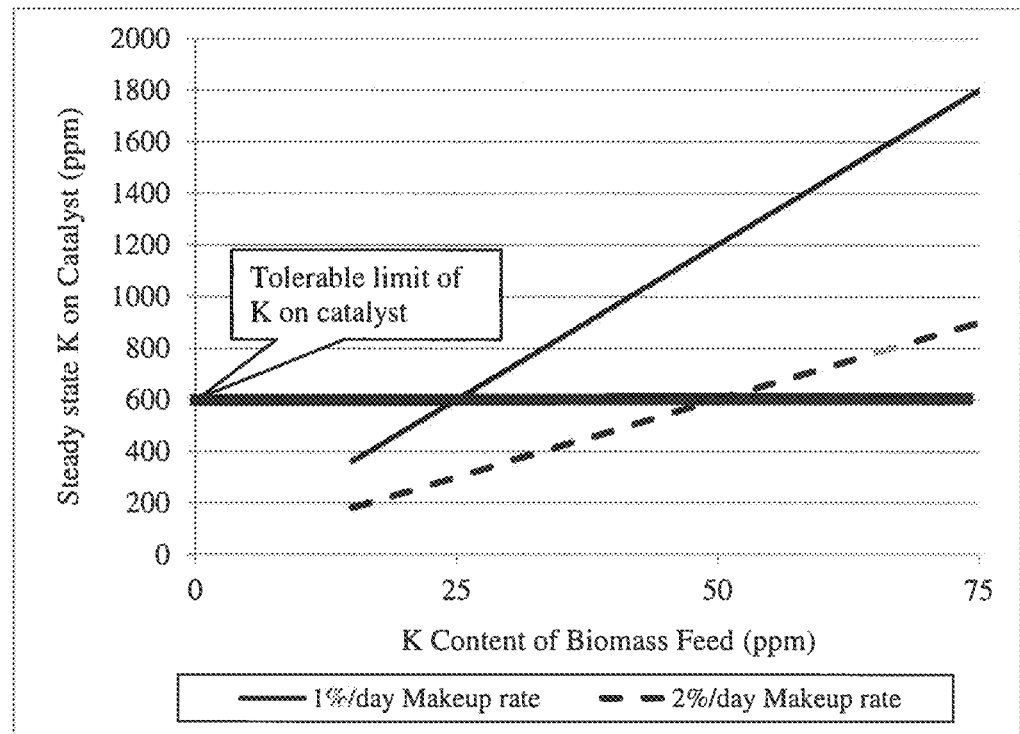
FIG. 1 shows the steady state K deposition on catalyst as a function of K content of biomass feedstock.

As a result of extensive research in view of the above, we have found that we can economically and effectively conduct a CFP process with feedstock comprising biomass containing alkali and alkaline earth metal components, for example, biomass containing at least 500 ppm alkali and alkaline earth metal components and other impurities such as sulfur and nitrogen components, to enhance the manufacture of valuable BTX products by way of a series of sequential steps.

The present improved process comprises steps of: a) treating biomass containing alkali and alkaline earth metal components, for example, biomass containing at least 500 ppm alkali and alkaline earth metal components, such as, for example, that provided from renewable sources of organic materials, to reduce alkali and alkaline earth metal content to result in treated biomass, b) feeding the treated biomass of step a), catalyst composition comprising, for example, one or more of a particular family of crystalline molecular sieves, for example, those characterized by a SAR greater than 5 and a CI from 1 to 12, and transport fluid to a CFP process fluidized bed reactor maintained at reaction conditions, for example, a temperature from 300 to 1000° C. and pressure from 100 to 1500 kPa, to manufacture a raw fluid product stream, c) feeding the raw fluid product stream of step b) to a solids separation and stripping system, hereinafter more particularly described, to produce separated solids and a fluid product stream, d) feeding the fluid product stream of step c) to a vapor/liquid separation system, hereinafter more particularly described, to produce a liquid phase stream comprising various components, such as those selected from the group consisting of water, char, coke, ash, catalyst fines, water soluble organics and heavy organics, and combinations thereof, and a vapor phase stream comprising benzene, toluene, xylenes and other aromatic compounds, e) feeding the vapor phase stream of step d) to a product recovery system, hereinafter more particularly described, to recover benzene, toluene, xylenes, and, optionally, olefins, and f) optionally recycling at least a portion of the recovered toluene or olefins of step e) to the fluidized bed reactor of step b).

As used herein, the term "alkali and alkaline earth metals" (AAEMs) comprise the metals in Groups 1 and 2 of the Periodic Table as agreed by the International Union of Pure and Applied Chemistry (IUPAC) including Li, Na, K, Rb, Cs, Fr, Be, Mg, Ca, Sr, Ba and Ra. The term AAEMs may also comprise additional elements that are frequently found in biomass along with the Group 1 and 2 elements, including Si, P, Al, Fe, Cu, Zn, Mn, or other metals in small concentrations, or combinations of these. The term AAEMs is meant to convey the sum of the elements other than C, H, O, N and S that are found in biomass and are not susceptible to conversion to hydrocarbonaceous fluid products. These elements are often found as salts, oxides, or in combination with various organic molecules, and are sometimes referred to as minerals.

As used herein, the term 'impurities' indicates the combination of AAEMs with sulfur and/or nitrogen.

As used herein, the terms "aromatics" or "aromatic compound" refer to a hydrocarbon compound or compounds comprising one or more aromatic groups such as, for example, single aromatic ring systems (e.g., benzyl, phenyl, etc.) and fused polycyclic aromatic ring systems (e.g., naphthyl, 1,2,3,4-tetrahydronaphthyl, etc.). Examples of aromatic compounds include, but are not limited to, benzene, toluene, indane, indene, 2-ethyltoluene, 3-ethyltoluene, 4-ethyltoluene, trimethylbenzene (e.g., 1,3,5-trimethylbenzene, 1,2,4-trimethylbenzene, 1,2,3-trimethylbenzene, etc.), ethylbenzene, styrene, cumene, n-propylbenzene, xylenes (e.g., p-xylene, m-xylene, o-xylene), naphthalene, methylnaphthalene (e.g., 1-methylnaphthalene), anthracene, 9,10-dimethylanthracene, pyrene, phenanthrene, dimethyl naphthalene (e.g., 1,5-dimethylnaphthalene, 1,6-dimethylnaphthalene, 2,5-dimethylnaphthalene, etc.), ethyl naphthalene, hydrindene, methylhydrindene, and dimethylhydrindene. Single ring and/or higher ring aromatics may also be produced in some embodiments. Aromatics also include single and multiple ring compounds that contain heteroatom substituents, i.e., phenol, cresol, benzofuran, aniline, indole, etc.

As used herein, the term "biomass" has its conventional meaning in the art and refers to any organic source of energy or chemicals that is renewable. Its major components can be: (1) trees (wood) and all other vegetation; (2) agricultural products and wastes (corn, corn stover, sugar bagasse, fruit, garbage ensilage, etc.); (3) algae and other marine plants; (4) metabolic wastes (manure, sewage), (5) energy crops (e.g. *miscanthus*), and (6) cellulosic urban waste. Examples of biomass materials are described, for example, in Huber, G. W. et al, "Synthesis of Transportation Fuels from Biomass: Chemistry, Catalysts, and Engineering," Chem. Rev. 106, (2006), pp. 4044-4098.

Biomass is conventionally defined as the living or recently dead biological material that can be converted for use as fuel or for industrial production. The criterion as biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes or byproducts that can be burned as fuel or converted to chemicals, including municipal wastes, green waste (the biodegradable waste comprised of garden or park waste, such as grass or flower cuttings and hedge trimmings), byproducts of farming including animal manures, food processing wastes, sewage sludge, and black liquor from wood pulp or algae. Biomass excludes organic material which has been transformed by geological processes into substances such as coal, oil shale or petroleum. Biomass is widely and typically grown from plants, including *miscanthus*, spurge, sunflower, switchgrass, hemp, corn (maize), poplar, willow, sugarcane, and oil palm (palm oil) with the roots, stems, leaves, seed husks and fruits all being potentially useful. Processing of the raw material for introduction to the processing unit may vary according to the needs of the unit and the form of the biomass. Biomass can be distinguished from fossil-derived carbon by the presence of $^{14}C$ in amounts significantly above that found in fossil fuels.

As used herein, the terms "olefin" or "olefin compound" (a.k.a. "alkenes") have their ordinary meaning in the art, and refer to any unsaturated hydrocarbon containing one or more pairs of carbon atoms linked by a double bond. Olefins include both cyclic and acyclic (aliphatic) olefins, in which the double bond is located between carbon atoms forming part of a cyclic (closed ring) or of an open chain grouping, respectively. In addition, olefins may include any suitable number of double bonds (e.g., monoolefins, diolefins, triolefins, etc.).

As used herein, the term "oxygenate" includes any organic compound that contains at least one atom of oxygen in its structure such as alcohols (e.g., methanol, ethanol, etc.), acids (e.g., acetic acid, propionic acid, etc.), aldehydes (e.g., formaldehyde, acetaldehyde, etc), esters (e.g., methyl acetate, ethyl acetate, etc.), ethers (e.g., dimethyl ether, diethyl ether, etc.), aromatics with oxygen containing substituents (e.g., phenol, cresol, benzoic acid etc.), cyclic ethers, acids, aldehydes, and esters (e.g. furan, furfural, etc.), and the like.

As used herein, the terms "pyrolysis" and "pyrolyzing" have their conventional meaning in the art and refer to the transformation of a compound, e.g., a solid hydrocarbonaceous material, into one or more other substances, e.g., volatile organic compounds, gases and coke, by heat, preferably without the addition of, or in the absence of, oxygen. Preferably, the volume fraction of oxygen present in a pyrolysis reaction chamber is 0.5% or less. Pyrolysis may take place with or without the use of a catalyst. "Catalytic pyrolysis" refers to pyrolysis performed in the presence of a catalyst, and may involve steps as described in more detail below. Catalytic fast pyrolysis (CFP) that involves the conversion of biomass in a catalytic fluid bed reactor to produce a mixture of aromatics, olefins, and a variety of other materials is a particularly beneficial pyrolysis process. Examples of catalytic pyrolysis processes are outlined, for example, in Huber, G. W. et al, "Synthesis of Transportation Fuels from Biomass: Chemistry, Catalysts, and Engineering," Chem. Rev. 106, (2006), pp. 4044-4098, incorporated herein by reference.

As used herein, the term "carbon yield" means the percentage of carbon in the biomass feed that is recovered in a particular product. Carbon yield is calculated by dividing the moles of carbon found in a product (or products) by the moles of carbon in the biomass fed and multiplying by 100 to arrive at a percentage carbon yield.

As used herein, the term "carbohydrates" means the organic compounds occurring in foods and living tissues and including sugars, starch, hemicellulose, and cellulose. Carbohydrates contain hydrogen and oxygen in approximately the same ratio as water (2:1).

As used herein, the term "washing fluid" is generally an aqueous solution, although other solvents may be used. The washing fluid may be chosen from among the group comprising water, acidified water, alkaline water, process water produced in the CFP process, water from a quench tower, water from a quench scrubber, water from a biomass drying process, and combinations thereof. The washing fluid may comprise aqueous solutions of acetic acid, formic acid, nitric acid, carbonic acid, carboxylic acids, sulfuric acid, phosphoric acid, hydrochloric acid, ammonium salts, alkyl ammonium salts, aryl ammonium salts, polyols (e.g. ethylene glycol, glycerol), or the like, or some combination of these. The washing fluid may comprise components that are not liquids or have very high equilibrium vapor pressures at normal temperature and pressure (25° C., 1 Bara) such as carbon dioxide, or ammonia, or mixtures of these or the like, but that comprise at least in part a liquid phase at washing conditions of temperature and pressure. The washing fluid may comprise steam, preferably wet steam, i.e. steam that comprises at least in part a liquid phase. The washing fluid may comprise a solvent other than water such as an alcohol, polyol (e.g. ethylene glycol, glycerol), other oxygenates, or a mixture of a solvent in water. The washing fluid is preferably an aqueous solution. The washing fluid may comprise at least a portion of an aqueous solution derived from the CFP process that may contain a wide range of components including aliphatic and aromatic alcohols, ketones, ethers, acids, esters, other oxygenates, amines, amides, nitriles, thiols, thioethers or thiophenes. In some embodiments the washing fluid may comprise at least a portion of used washing fluid that has optionally been treated and recycled. In some embodiments the washing fluid may comprise an aqueous phase that has been exposed to gaseous combustion products comprising a component selected from the group NO, $NO_2$, $CO_2$, or combinations of these or the like.

Catalyst components useful in the context of this invention can be selected from any catalyst known in the art, or as would be understood by those skilled in the art. For the present invention, useful catalysts include those containing internal porosity selected according to pore size (e.g., mesoporous and pore sizes typically associated with zeolites), e.g., average pore sizes of less than about 100 Angstroms (Å), less than about 50 Å, less than about 20 Å, less than about 10 Å, less than about 5 Å, or smaller, or between about 5.0 Å and about 6.5 Å, or between about 5.9 Å and about 6.3 Å or between about 7 Angstroms and about 8 Å, or between about 7.2 Å and about 7.8 Å may be used. Non-limiting examples of these crystalline molecular sieves are those having the structure of ZSM-5, ZSM-11, ZSM-12, ZSM-22, ZSM-23, ZSM-35, ZSM-48, ZSM-50, zeolite beta, mordenite, ferrierite, or combinations thereof. For the catalyst compositions useful in this invention, the suitable molecular sieve may be employed in combination with a support or binder material such as, for example, a porous inorganic oxide support or a clay binder such as alumina, zirconia, silica, magnesia, thoria, titania, boria and combinations thereof.

The molecular sieve for use herein or the catalyst composition comprising it may have original cations replaced, in accordance with techniques well known in the art, at least in part, by ion exchange with hydrogen or hydrogen precursor cations, by metals chosen from among Ni, Co, Fe, Ga, Ti, V La, Ce, Cr, and Mn, or some combination of these.

Examples of apparatus and process conditions suitable for the CFP process are described in U.S. Pat. Nos. 8,277,643; 8,864,984; 9,169,442 and 9,249,080, and U. S. Patent Publication Nos. 2014/0027265 A1; 2014/0303414 A1 and 2013/0060070A1, each incorporated herein by reference. Conditions for CFP of biomass may include one or a combination of the following features (which are not intended to limit the broader aspects of the invention): a catalyst composition; a fluidized bed, circulating bed, moving bed, or riser; an operating temperature in the range of 300 to 1000° C.; and a solid catalyst/biomass mass ratio of from 0.1 to 40.

Figure 6:
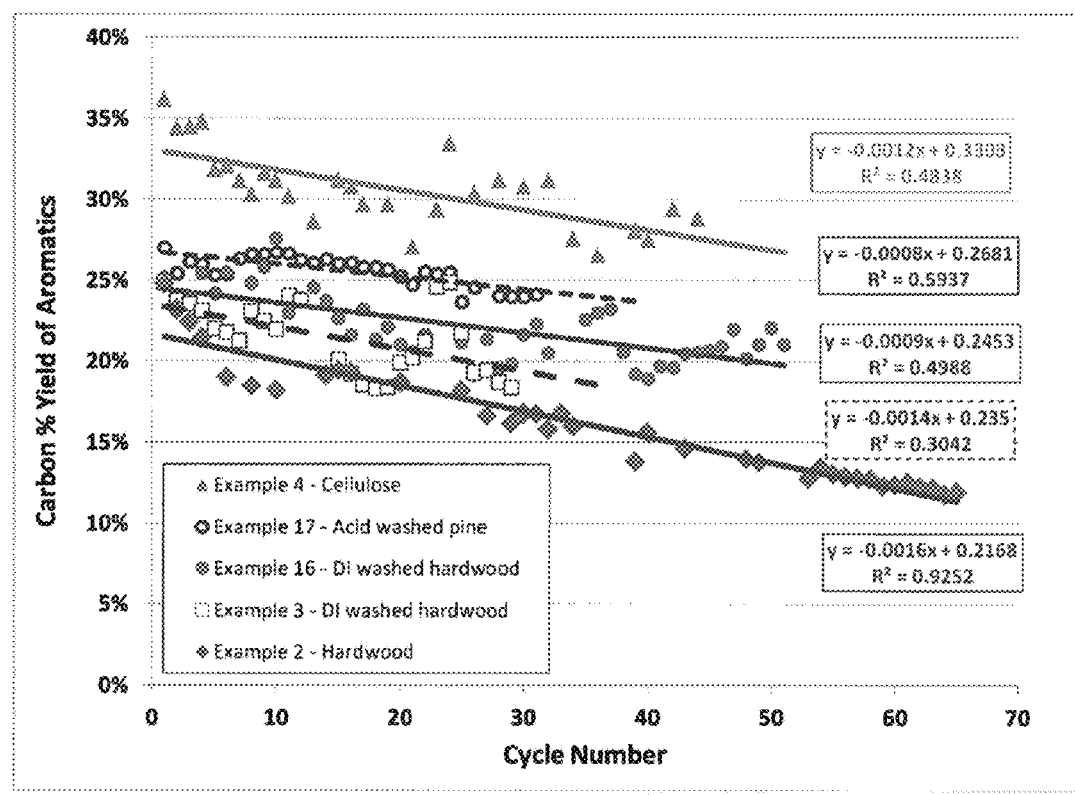
FIG. 6 is a plot of aromatics yield vs. CFP process cycles for various biomass feedstocks.

As used herein, the term "catalyst deactivation rate" is defined as the amount of loss of the yield of a particular product (or products) in a single cycle of catalytic pyrolysis and catalyst regeneration divided by the carbon yield of that product. Catalyst deactivation rate is calculated by taking the slope of a line that is fitted to a graph of Carbon Yield of a particular product or products on the y-axis vs Cycle Number on the x-axis where the cycles are all of the same length of time for a discontinuous or semi-continuous process, or time on stream on the x-axis for a continuous process. When a catalyst is deactivating the slope is negative, but the rate is often discussed in terms of its absolute value, i.e. a faster deactivation rate is one with a more negative slope. FIG. 6 shows catalyst deactivation data and the deactivation rates calculated for several experiments.

The term "char" refers to the carbon rich (at least 10 mass % C) solid material that has been at least partially converted from biomass in a combustion, pyrolysis, or catalytic pyrolysis process. Char typically contains a high percentage of carbon, some hydrogen, and some oxygen, and may also contain some of the other elements that were present in the biomass that was reacted in the process, such as Ca, K, P, Na, Mg, Mn, Si, S, N, Fe, or other elements. Char may appear similar in shape and overall structure to the initial biomass particles that were reacted, or it may appear to have been ground to finer particles in the process, or it may be agglomerated into larger particles, or combinations of these. In some instances char may contain substantial portions of catalyst that have become intermingled with the carbonaceous material.

As used herein, the term "coke" is given its conventional meaning in the art and is used to refer to carbon rich solid deposits on catalysts or other materials. Coke deposits are typically removed by combustion in a catalyst regeneration process. Coke is distinct from char in that coke is typically deposited in the pores of catalysts or on the surface, is more highly aromatic, and less reactive than char. In many instances the separation of coke and char is not facile and coke and char are often considered together as solid products, i.e. coke plus char.

As used herein the terms 'total elapsed time' or 'clock time' refers to the actual time that passes starting from the time at which biomass first is contacted with a wash fluid in step 2) until the time at which the washed and optionally rinsed biomass is separated from the liquids.

As used herein the term 'contacting time' indicates the time during which the biomass is in contact with the washing fluid or the rinse solution at the target washing temperature. The contacting time is summed up over the number of cycles of contact, e.g. three cycles of 40 minutes contact each result in a contacting time of 120 minutes.

Biomass contains various amounts of impurities such as AAEMs depending on the nature of the material, its collection, storage, and handling that can negatively impact the CFP process. AAEMs present in biomass are often quantified as the residual ash recovered after a complete combustion of the combustible materials in the biomass. As estimated in this manner the AAEMs content of biomass varies over a wide range. Entrained ash, i.e., soil, is largely a property of feedstock handling methods and can be mitigated through harvesting operations, management practices, and mechanical separation. Physiological-bound AAEMs, termed "structural ash," result from intrinsic biomass properties such as plant type, maturity, and anatomical fractions and may require advanced preprocessing methods to effectively remove these bound minerals. Structural ash can vary widely, both in quantity and in composition, in different types of biomass. Pine wood generally has low ash content (~0.5%), hardwoods have intermediate ash contents of 0.5 to 5%, while *miscanthus* and corn stover may have ash content of about 2 to 10%, and rice hulls have ash content as high as 21%.

In one embodiment of the present invention the feed biomass before treatment in step a) comprises at least 100, or at least 250, or at least 500, or at least 750, or at least 1,000, or at least 2,000, or at least 5,000, or at least 10,000 ppm of potassium (K), such as, for example from 100 to 10,000, or from 250 to 1,000 ppm potassium. In one embodiment the feed biomass before treatment in step a) comprises at least 250, or at least 500, or at least 1,000, or at least 2,000, or at least 5,000, or at least 10,000, or at least 15,000, or at least 20,000 ppm of calcium (Ca), such as, for example from 250 to 20,000, or from 250 to 1,000 ppm calcium. In one embodiment the feed biomass before treatment in step a) comprises at least 250, or at least 500, or at least 1,000, or at least 2,000, or at least 5,000, or at least 10,000, or at least 15,000, or at least 20,000 ppm of AAEMs, such as, for example from 250 to 20,000, or from 500 to 2,000 ppm AAEMs. In one embodiment the feed biomass before treatment in step a) comprises at least 250, or at least 500, or at least 1,000, or at least 2,000, or at least 5,000, or at least 10,000, or at least 15,000, or at least 20,000 ppm of chlorine (Cl), such as, for example from 250 to 20,000 ppm chlorine. Chlorine is typically found in biomass as chloride ion. All values of ppm are parts per million by mass.

Likewise, in one embodiment the feed biomass before treatment in step a) comprises at least 100, or at least 250, or at least 500, or at least 750, or at least 1,000, or at least 2,000, or at least 5,000, or at least 10,000 ppm of sulfur (S), such as, for example from 100 to 10,000 ppm sulfur. In one embodiment the biomass of the feed biomass before treatment in step a) comprises at least 0.01, or at least 0.1, or at least 0.2, or at least 0.5, or at least 0.75, or at least 1.0, or at least 1.2, or at least 1.5% by weight of nitrogen (N), such as, for example from 0.01 to 1.5% nitrogen.

Without wishing to be bound by theory, there are several mechanisms by which impurities such as AAEMs, or other metals, are believed to poison or deactivate CFP catalyst or otherwise impair the operability and/or productivity of a CFP process. AAEMs can react with Al/Si materials such as zeolites to form $KAlSiO_4$ (kaliophilite), or similar materials that are refractory, thus destroying the zeolite structure and causing irreversible loss of catalyst activity. AAEMs ions can also ion exchange with protons at the Brønsted acid sites of a zeolite to neutralize its acidity. And minerals such as $KAlSiO_4$, $K_2CO_3$, $K_2SO_4$, $CaCO_3$, $CaSO_4$, $CaO$, $Ca_2SiO_4$, or mixtures of these or other compounds or minerals, can block pores, preventing reactants from reaching the catalytically active sites or modifying the transport of materials to or from or within the catalyst. The reversibility of pore blockage by minerals will depend on the specific compound that is formed, but many compounds will be formed essentially irreversibly.

Minerals or other compounds may aggregate on the surfaces of catalyst particles limiting access to the catalytically active sites, reducing mass transport of reactants to the catalyst, reacting with feed materials, causing aggregation of particles, or acting by some combination of these. Solids formed by the AAEMs can simply occupy volume in the CFP reactor system, the separators, regenerators, or other equipment, reducing throughput and complicating separation, recovery, and purification processes Impurities such as AAEMs form a significant fraction of the ash produced in a CFP process reactor or regenerator. Moreover, AAEMs can promote corrosion of the equipment in which the CFP process and various ancillary steps are conducted, thus shortening equipment life, increasing maintenance costs, and increasing capital costs. AAEMs may be carried into various effluent streams where they may increase the cost and complexity of effluent cleanup. There are many benefits to be obtained by eliminating or minimizing the concentrations of the AAEMs in the biomass feed to a CFP process.

While not wishing to be bound by theory, there are many ways in which sulfur or nitrogen impact the operability, effectiveness, or economic feasibility of a CFP process. Sulfur and nitrogen can form compounds that increase corrosion of process equipment, reduce catalyst effectiveness, contaminate effluents, or cause health and/or safety concerns for personnel. Sulfur and nitrogen compounds are catalyst poisons or inhibitors that can significantly reduce catalyst activity or selectivity to desired products. Sulfur and nitrogen compounds can be passed into product purification equipment where they can increase the cost and/or complexity of separation and recovery processes. The concentrations of sulfur and nitrogen compounds tolerated in commercial products such as benzene, toluene, xylene, naphthalene, or olefins are limited so that these products can be made unacceptable to the market by their presence. The concentrations of sulfur and nitrogen compounds in various process effluents are limited by regulations and laws so that removing sulfur and nitrogen compounds can increase costs or render a process economically infeasible.

The present invention describes a lignocellulosic biomass feedstock having ultra-low potassium (K) content and methods for preparing an ultra-low K content feedstock from available biomass sources. Naturally occurring lignocellulosic biomass feedstocks typically have high potassium contents ranging from ≥600 ppm for wood to >10,000 ppm for corn stover. Thus, the use of such materials in the conversion of biomass to useful products, e.g., benzene, toluene, and xylenes (BTX), olefins, and other desirable products, in the presence of acidic catalysts is disadvantaged as the K acts as a poison to catalyst acidity and activity. In such a process, the K cations effectively titrate out the protons of the acidic catalyst on an equimolar basis, neutralizing their acidity, and thus reducing catalyst effectiveness for the conversion of biomass to useful chemicals. Recovery of catalyst activity then requires significant and expensive addition of fresh active catalyst or other means.

Fluid catalytic cracking (FCC) is a major process used in oil refining to convert heavy gas oils into lower molecular weight products. Similar to CFP, the FCC process uses a fluid bed of catalyst comprising a solid acid zeolite to catalytically crack the molecules. Coke is deposited on the catalyst in the reactor, and the catalyst is burned clean of these deposits in a parallel operating regenerator. The reactor and regenerator exchange slip streams of catalyst between them and the entire process operates at essentially steady state with respect to catalyst activity. Contaminants in FCC feeds, such as AAEM's and other metals not normally present in significant amounts in biomass, can accumulate on the FCC catalyst causing deactivation. To manage catalyst losses and manage the catalytic activity of the entire system including deactivation caused by metal, small amounts of circulating catalyst (called "E-cat" to indicate that the catalyst activity has "equilibrated" with respect to catalyst deactivation) are removed and the losses are replaced with fresh catalyst having full activity. Based on the similarities with FCC, the maximum level of K which is allowed to be deposited on or in the catalyst particle in the CFP process can be estimated, such that the catalyst make-up rate becomes less expensive and within the bounds of conventional practice, while still maintaining adequate catalyst activity for conversion of reactants. For equilibrated ZSM-5 catalyst of the type used for the CFP process of the present invention, a target of ≤600 ppm K deposited on or in the catalyst particles at steady state can be calculated. This corresponds to a loss of ≤8% of the available acid sites on the catalyst. The catalyst formulation plays a role in the determination of the acceptable level of potassium deposition and consequently the maximum allowable potassium in the biomass feedstock. Catalyst composition variables of importance include the silica/alumina molar ratio of the ZSM-5 or other zeolite, and the percent of zeolite crystal in the catalyst matrix materials. In general, lower silica/alumina ratio and higher zeolite weight percent loading result in more acid site density, and greater capacity to exchange with potassium, i.e. greater tolerance for potassium deposition without significant loss of acidity and activity.

Also, in FCC, typically acceptable catalyst make-up rates (fresh catalyst addition per day) are on the order of 1-3% per day of the catalyst inventory in order to minimize catalyst costs and improve the economics of the process. A mass balance model was developed to calculate the amount of K that would be deposited on the catalyst at steady state as a function of the feedstock K content and the catalyst makeup rate. The results of the model are shown in FIG. 1 (steady state K deposition on catalyst as a function of K content of biomass feedstock). From FIG. 1 it can be seen that in order to maintain the catalyst at a steady state K content of 600 ppm K or less, a biomass feedstock containing at most 25 ppm K will allow a make-up rate of 1% per day when converting biomass feedstock to products such as BTX over a ZSM-5 catalyst. From the Figure, if a 2% per day catalyst makeup rate is desired, then the allowable K content in the biomass feed is no more than 50 ppm K.

Although sodium is less of a concern than potassium since it is normally much less abundant in natural biomass, it should be noted that sodium has a similar impact on catalyst activity as does potassium and that the tolerance limit and all the desirable ranges of concentration for potassium can be applied to sodium, adjusting, of course, for the difference in atomic weight of sodium (23 amu) compared to potassium (39 amu), i.e. in mass units the tolerance for Na is 23/39 of that for K. The tolerance is approximately 360 ppm Na in the steady state catalyst described above vs a tolerance of 600 ppm K. Moreover the sodium and potassium must be considered together when both are present in the feed so that the number of moles of Na and K taken together does not exceed the tolerance of the catalyst. For the E-Cat catalyst of this example, a limit of approximately 0.015 moles of Na plus K per kg of catalyst can be calculated. In some embodiments of this invention the average concentration of Na plus K in the catalyst inventory in the reactor is ≤0.1, or ≤0.05, or ≤0.03, or ≤0.02, or ≤0.015, or from 0.001 to 0.5, or from 0.005 to 0.3 moles per kg of catalyst. In some embodiments of this invention the average concentration of Na plus K in the catalyst inventory in the reactor is ≤3000 ppm, or ≤1500 ppm, or ≤1000 ppm, or ≤600 ppm, or ≤360 ppm, or from 10 to 3000 ppm, or from 100 to 1000 ppm.

Without wishing to be bound by theory, it is believed that the most important sites for conversion of biomass to BTX in the CFP process are the Brønsted acid sites in the catalyst. For example, for a ZSM-5 catalyst that comprises approximately 0.2 moles of Brønsted acid sites per kg of catalyst, the activity of the catalyst drops below the acceptable activity threshold when 8% or 0.016 mole/kg of Brønsted sites are neutralized, leaving 0.184 mole/kg of Brønsted sites. The target K content of the biomass feed for a process that uses a catalyst with more or fewer Brønsted acid sites will need to be adjusted accordingly such that at least about 90% of the initial Brønsted acid sites remain active at steady state.

The Brønsted acid site density can be measured by adsorption of an amine such as ammonia or isopropyl amine on the catalyst. An embodiment of the invention is a process wherein fresh catalyst is added to the reactor at a rate sufficient to maintain the average Brønsted acid site density of the catalyst inventory in the reactor at no less than 75%, or no less than 85%, or no less than 92%, or from 75 to 99%, or from 85 to 95% of the Brønsted acid site density of the fresh catalyst as measured by isopropyl amine adsorption.

The treated biomass feedstocks of this invention contain an ultra-low level of K (≤50 ppm) and additionally, a reduced level of Ca (≤300 ppm). These feedstocks abate catalytic deactivation significantly compared to similar untreated or less-effectively treated feedstocks when used in a catalytic process for converting biomass to aromatics with an acidic zeolite catalyst, such as the CFP process.

An additional advantage of the present inventive process is that the ultra-low potassium biomass is essentially unchanged in cellulosic and hemicellulose content. When biomass is contacted with strong acid, such as in acid hydrolysis, or at high temperatures, major compositional changes are observed due to the hydrolysis of hemicellulose. Indeed, the hemicellulose component of the biomass is significantly reduced due to the more reactive nature of the hemicellulose relative to cellulose. As such, the compositional ratio of cellulose/hemicellulose in the biomass after contact with acid is greatly affected. For a process such as conversion of biomass to aromatics over an acidic catalyst, the yields of aromatics are deleteriously affected by such feed pretreatment with strong acid as well as other severe forms of pretreatment, such as strong acid, high temperatures, or steam explosion.

The present method of pretreating biomass feedstock involves the mild extraction of K using wash solutions such as a mild acid solution (pH ~2.0-5.0) at solution to biomass mass ratio of at least 1 to 1 in either multiple treatments or with continuous addition of fresh solution accompanying withdrawal of used solution. This wash step or steps can be performed in a variety of equipment such as a digester containing biomass with flowing solution, a continuous stirred tank reactor (CSTR) containing the biomass and wash solution, or a continuous belt filter with wash solution spray, or any similar equipment that facilitates contact of wash solution with the catalyst and separation. The resultant biomass may be contacted with water or other rinse solution after wash steps. The rinse step or steps may be conducted in a digester containing biomass with flowing solution, a continuous stirred tank reactor (CSTR) containing the biomass and rinse solution, or a continuous belt filter with rinse solution spray, or any similar equipment.

The conditions of the inventive process for removing AAEMs from biomass can vary over a wide range. The more desirable conditions are those that effectively remove AAEMs without removing or chemically modifying the cellulose and/or hemicellulose in the biomass. Higher temperatures, stronger acid or base solutions, reactive chemical solvents or reagents (e.g. oxidants or reductants), longer contacting times, larger wash solution to biomass ratios, higher pressures, or combinations of these may improve the removal of AAEMs but may also remove carbohydrates or other carbonaceous materials or modify their chemical structures. Total elapsed time for the process is also a concern for economic reasons since longer elapsed times require much larger and more expensive equipment, larger volumes of wash and rinse solutions, and are not as easily adaptable to continuous or semi-continuous processing of the biomass in later steps.

Figure 2:
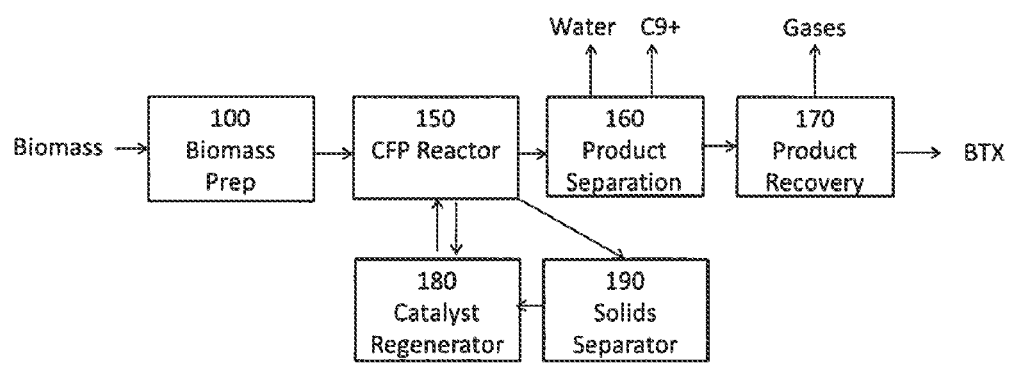
FIG. 2 is a block flow illustration of an embodiment of the biomass to aromatics process of the invention.

Referring more particularly to FIG. 2, a conceptual illustration of a biomass upgrading process for producing aromatics by the present invention is presented. Biomass is prepared in the biomass preparation system (100) in which at least a portion of the AAEMs is removed from the biomass. The treated biomass effluent from system 100 is fed to the CFP process reactor (150) containing the catalyst. In the CFP reactor the biomass pyrolyzes to produce pyrolysis products that are converted further to aromatics, olefins, water, and other products through the action of the catalyst. The fluid products of the CFP process reactor are initially separated in a product separation system (160) to produce an aqueous stream, a heavy organic stream comprising $C_9^+$ materials, and a vapor stream comprising the fixed gases $CO$, $CO_2$, $CH_4$, $H_2$, light paraffins and olefins having 1 to 4 carbon numbers, non-aromatic hydrocarbons having 5 or more carbon numbers, and BTX, that are further separated and purified in a series of steps in the product recovery system (170) into a vapor stream comprising the fixed gases $CO$, $CO_2$, $CH_4$, $H_2$, light paraffins and olefins, and one or more light aromatics fractions comprising BTX, and one or more liquid fractions (not shown) comprising heavier aromatics. The raw product stream exiting CFP reactor (150) is separated in one or more solids separators (190) and a solids fraction comprising deactivated catalyst is regenerated in a catalyst regenerator (180) and returned to the CFP reactor. Additional catalyst may pass from the CFP reactor (150) to a steam stripper (not shown) and to the catalyst regenerator (180). Optionally, any catalyst recovered from the CFP reactor (150) may be washed to remove alkali and alkaline earth metals as part of the regeneration process, either before or after the oxidative regeneration in regenerator 180.

Figure 3:
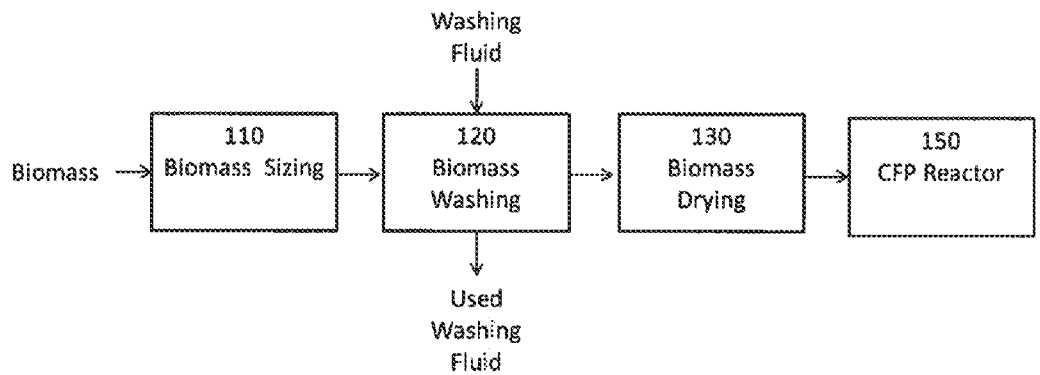
FIG. 3 is a block flow illustration of an embodiment of the biomass treatment method of present process.

Referring more particularly to FIG. 3, which shows a block flow illustration of an embodiment of the functions that comprise the biomass treatment step a). Biomass intended as feedstock for a CFP process often comprises large particles or materials that have only been crudely separated and cut in order to be transported to the processing site. In some cases the starting biomass feed comprises chips of at least 2, or at least 3, or at least 5, or at least 10, or at least 15 cm, at the longest dimension. Optionally, a preliminary biomass sizing system (110) is preferred to reduce the size of the biomass feed material, or to make the size range of the material more homogeneous, or both. The preliminary sizing of the present invention can comprise any type of slicing, dicing, cutting, grinding, powdering, milling, or other size reduction process as needed to provide a material that has size characteristics suitable for processing. In some cases a very small particle or powdered biomass is available that is preferably made into pellets, bars, tablets, briquettes, or other types of particles of a larger size that is more suitable for handling in the downstream equipment. In this case the process of combining small particles into larger particles is an optional step of the present invention.

In some embodiments, the average size of the ground feed composition exiting the sizing system (110) may comprise ≤50%, or ≤25%, or ≤5%, for example ≤2%, of the average size of the feed composition fed to the sizing system (110). In some embodiments the average particle size of the biomass exiting the sizing system (110) may be ≤20 cm size (longest dimension of the particle), or ≤15 cm, or ≤10 cm, or ≤5, or ≤2, for example from 0.001 to ≤20 cm, or from 0.002 to 10 cm, or from 0.005 to 1 cm, or from 0.01 to 2 cm, or from 0.1 to 2 cm, or from 0.2 to 2 cm in size. In some embodiments the particles exiting the sizing system (110) may be characterized as those that pass through a standard sieve with openings of 25.4 mm (1 inch), or 19 mm (0.75 inch), or 12.7 mm (0.5 inch), or 6.35 mm, (0.25 inch) or 4 mm (5 mesh), or 2 mm (10 mesh), or 0.841 mm (20 mesh), or 0.42 mm (40 mesh), or 0.25 mm (60 mesh), or 0.149 mm (100 mesh), or those particles that pass through the larger but not the smaller of any two of the aforementioned screens. The following convention is used to characterize particle size by mesh designation: a "+" (plus sign) before the sieve mesh indicates the particles are retained by the sieve; a "−" (minus sign) before the sieve mesh indicates the particles pass through the sieve. In some embodiments the ground feed composition exiting the sizing system may comprise a particle size distribution within which at least 50% of the particles are ≤1400, or ≤1000, or ≤800, or ≤600, or ≤300, or from 1 to 1400, or from 1 to 600, or from 1 to 300 microns as measured by laser diffraction or other methods. In some embodiments at least 50%, or at least 65%, or at least 75%, or at least 85%, or at least 95%, for example from 50 to 100%, of the particles in the biomass exiting the sizing system (110) may be characterized with the size or screen characterizations described above. As used herein, particle size is defined as the longest dimension of a particle which can be determined by examination of an image of particles or by passing particles through screens characterized by a specific screen size.

In some embodiments, the particles of biomass fed to the biomass washing system (120) may comprise particles with large aspect ratios. The "aspect ratio" for solid 3-dimensional particles is the length of a particle at its longest divided by the smaller of the two perpendicular dimensions at its largest area cross-section perpendicular to the long axis. An average aspect ratio is the average of the aspect ratios of a representative sample of particles as determined by microscopic examination of at least 50 randomly chosen particles. In some embodiments the average aspect ratio of particles fed to the washing system (120) may be at least 1.1, or at least 2, or at least 3, or at least 5, or at least 10, or at least 20, for example from 1.1 to at least 40, or from 3 to 20. In some embodiments the average aspect ratio of particles of the sized biomass of step 1) may be at least 1.1, or at least 2, or at least 3, or at least 5, or at least 10, or at least 20, for example from 1.1 to at least 40, or from 3 to 20. In some embodiments the smaller of the two dimensions perpendicular to the long axis of the particles is less than 25, or less than 12, or less than 6, or less than 3, or less than 2, or less than 1 mm in length. Large particle feed material may be more easily transportable than small particle feed material. On the other hand, in some cases it may be advantageous to feed small particles to the CFP reactor (150). The use of one or more sizing systems allows for the transport of large particle feed between the biomass source and the CFP process, while enabling the feed of smaller particles to the CFP reactor (150).

Suitable equipment capable of sizing the feed composition for use in sizing system 110 of FIG. 3 is commonly available. For example, the sizing system may comprise an industrial mill (e.g., hammer mill, ball mill, etc.), a unit with blades (e.g., chipper, shredder, etc.), or any other suitable type of grinding system. In some embodiments, the sizing system may comprise a cooling system (e.g., an active cooling systems such as a pumped fluid heat exchanger, a passive cooling system such as one including fins, etc.), which may be used to maintain the feed composition at relatively low temperatures (e.g., ambient temperature) prior to introducing the feed composition to the CFP reactor (150). The sizing system may be integrally connected to the reactor or may be provided as a separate unit from the reactor.

While the sizing system is shown in FIG. 3 preceding the drying system (130), the order of these operations may be reversed in some embodiments. In still other embodiments, the drying and sizing steps may be achieved using an integrated unit. In some embodiments there may be a sizing step before the washing step and a second sizing step after the washing step. In some embodiments a drying step may follow the washing step and precede a second sizing step or a drying step may follow a second sizing step. In some embodiments the washing step, or drying step, or both precede the final sizing step. In some embodiments there may be multiple drying steps before or after a second sizing step.

The biomass treatment step a) includes a fluid washing system (120) that removes or modifies at least a portion of the impurities (AAEMs, sulfur, and/or nitrogen) present in the biomass feed. The washing fluid for the fluid washing system (120) may be chosen from among the group comprising water, acidified water, alkaline water and process water produced in the CFP process. It may comprise aqueous solutions of organic or mineral acids such as acetic acid, formic acid, nitric acid, carbonic acid, carboxylic acids, sulfuric acid, phosphoric acid, hydrochloric acid, or ammonium salts, alkyl ammonium salts, aryl ammonium salts, or organic polyols (e.g. ethylene glycol, glycerol), or the like, or some combination of these. The washing fluid is preferably an aqueous solution. The washing fluid could comprise a solvent other than water such as an alcohol, polyol (e.g. ethylene glycol, glycerol), or a mixture of a solvent in water. In some embodiments the washing fluid of step 2) comprises water obtained from municipal water supply, river, or freshwater lake, wherein the total hardness (sum of concentration of Ca, Mg, K, and Na) is ≤181 ppm. The ratio of the mass of washing fluid utilized to the mass of the biomass feed utilized can range from 1 to 10,000, or from 2 to 1,000, or from 5 to 100, or at least 1, or at least 2, or at least 3, or at least 5, or at least 10, or at least 20 grams of solution per gram of biomass. In embodiments wherein more than one wash step is used the ratio of washing fluid to biomass used can be different in different steps, i.e. the ratio can be larger in later steps or can be smaller in later steps than in the first step. In some embodiments the wash fluid (solution) fed to washing step 2) is processed as a batch, semi-continuously fed, or continuously fed to the process.

In one embodiment of the present invention the temperature of the washing step(s) is maintained at no more than 100, or 90, or 80, or 70, or 60, or 40, or 25° C., or in the range from 10 to 90, or 10 to 80, or 20 to 70° C. The temperatures of the steps may not be the same. Temperatures of later steps can be maintained at lower temperatures than the first step, or temperatures of later steps can be maintained at higher temperatures than the first step.

In some embodiments of the invention the pH of the washing solution is no more than 5, or no more than 4, or no more than 3.5, or no more than 3.0 or no more than 2.5, or no more than 2.3, or no more than 2.0, or in the range from 2.0 to 5, or in the range from 2.0 to 3.5, or in the range from 2.5 to 3.0. In some embodiments the wash solution(s) used in later washing steps has a pH that is higher than that used in the first wash step. In some embodiments the pH of the second and succeeding wash steps is no more than 5, or no more than 4, or no more than 3.5, or no more than 3.0, or no more than 2.5, or from 2.5 to 5.0, or from 3.0 to 4.0. In some embodiments the pH of the wash solution in any washing step is adjusted during that washing step while the biomass is in contact with the wash solution by the addition of a solution of lower pH than the pH measured for the wash solution that is in contact with the biomass. In some embodiments the washing fluid comprises acidified water with pH greater than 2.

In some embodiments of the present invention the total elapsed time for the washing and rinsing steps is no more than 10, or no more than 6, or no more than 4, or no more than 3, or no more than 2, or no more than 1, or from 0.1 to 6, or from 0.1 to 4 hours. In some embodiments the contacting time of biomass with a wash solution in an individual washing step is no more than 60, or no more than 40, or no more than 20, or no more than 10, or no more than 5, or no more than 2, or from 0.1 to 60, or from 0.5 to 40 minutes. In some embodiments the sum of contacting times of biomass with wash solution in all of the washing steps or in a continuous process is no more than 120, no more than 90, or no more than 60, or no more than 40, or from 1 to 120, or from 2 to 90, or from 2 to 30 minutes.

The washing system (120) can be a single washing step, or multiple steps, or a continuous process of feeding wash solution through the biomass until the desired reduction of impurities has been achieved as measured in the biomass or in the wash solution. In some embodiments the washing system can comprise multiple steps, each of which utilizes a different washing fluid. In some embodiments the washing system comprises a washing step with an acidic washing fluid followed by a washing step using water or an aqueous fluid with a higher pH than the acidic washing fluid.

The washing step or steps can be followed by a rinsing step with a water solution that contains a low concentration of AAEMs, such as deionized (DI) water, or dilute acid, or water recovered from a wash step, or a similar water solution. In some embodiments the rinsing step can be carried out in multiple steps with the same or different solutions used in each rinse step, or as a continuous process. The rinse solution can be water that has been produced in the process and treated to reduce AAEMs content to an acceptable level. In some embodiments the rinse solution comprises less than 5, or less than 2, or less than 1, or less than 0.1, or less than 0.05, or less than 0.01 ppm, or from 0.001 to 2, or from 0.01 to 0.1 ppm of K. In some embodiments the rinse solution comprises less than 20, or less than 10, or less than 5, or less than 2, or less than 1, or less than 0.1, or less than 0.05 ppm, or from 0.01 to 20, or from 0.01 to 5 ppm of Ca. The washing system may be conducted as a batch process or as a continuous process. In some embodiments the contacting time of the biomass with the rinse solution is less than 30, or less than 10, or less than 5, or less than 3 minutes, or from 0.1 to 30, or from 1 to 10 minutes.

One embodiment of the present invention comprises a wet milling process to both wash and comminute the biomass feed. Wet milling of biomass to remove contaminant metals typically comprises milling of biomass that has not been dried to a low moisture content, but can optionally comprise exposing the biomass to a washing fluid as described previously or water or other fluids for a period of time and then milling the wet mixture or exposing the biomass to the washing fluid and milling simultaneously.

In one embodiment, the washing fluid is continuously added to the as-received, dried, or previously wetted biomass before or during the milling process. The product of the wet milling is typically a slurry of ground carbonaceous material suspended in the washing fluid or water. The product can be separated by filtration or centrifugation with continuous water washing and the solids washed with further washing fluid to remove further undesirable elements and separate them from the biomass particles.

Biomass may be comminuted to a small particle size to enhance the yield of useful products in the CFP process, so the wet milling combines a preferred comminution step with a contaminant removal step to provide a biomass feed with lower amounts of contaminants. Wet milling does not suffer from the danger of fire or explosion of any powdered biomass that can occur in dry milling, chopping, or shredding processes. Fire is a common occurrence in handling of dry powdered carbonaceous materials. During wet milling the biomass heats up much less than during dry milling; the heating is believed to decrease the yield of useful products (e.g. aromatics, olefins) and increase the yield of char. Adding a wash step to the wet milling can further reduce the contaminant content of the biomass. Water produced in the CFP process can optionally be used for the wet milling step, for the washing step, or for both steps, thus providing a means of recycling some of the dissolved organics into the CFP process and minimizing water requirements.

CFP process water may be treated before being used in the biomass washing system (120) to remove impurities from the biomass and/or recover organic species contained in the water. Methods to separate the impurities from the water can include distillation, filtration, drying, membrane filtration, precipitation, flocculation, reverse osmosis, ion exchange, lime softening, or other treatment, or some combination of these. Removing the impurities, particularly alkali metals, enhances catalyst life and improves the product yield of the CFP process, and reduces the downstream corrosion from the impurities.

In some embodiments the washing system (120) can be conducted in a countercurrent configuration wherein the flows of biomass to be washed and the washing fluid are flowing in opposite directions as they encounter each other. In this configuration the biomass is encountering and interacting with washing fluid of increasing purity as it flows from the entry of the washing process towards the exit of the washing process. In a countercurrent washing process biomass entering the washing process that has the highest concentration of AAEMs, sulfur, or nitrogen would at first encounter the least pure washing fluid, i.e. the washing fluid with the highest concentration of AAEMs, sulfur, or nitrogen removed from the biomass. As the biomass flows through the process it encounters wash fluid of increasing purity, i.e. wash fluid with lower concentrations of impurities, so that the effectiveness of the washing and impurity removal is improved.

In another embodiment of the present invention, the CFP process water is purified for recycle to the biomass washing system (110) by hydrothermal gasification. Hydrothermal gasification has the advantage that in addition to using the water to remove AAEMs the carbonaceous species can be converted to useful gaseous products $H_2$ and CO. Sulfur and nitrogen compounds may also be converted to compounds that are more readily separated from the carbonaceous species by gasification. During hydrothermal gasification the hydrocarbon-containing aqueous CFP process waste water stream is pressurized and heated, the hydrocarbon molecules undergo thermal pyrolysis, hydrolysis, oxidation, and hydrothermal gasification reactions resulting in the formation of $H_2$, CO, methane, $CO_2$, and other gases. Hydrothermal gasification is typically carried out at temperatures of at least 200, at least 300, at least 350, at least 400, for example from 200 to at least 450° C., and pressures of at least 1, or at least 2, or at least 8, or form 1 to at least 20 atmospheres, or the pressure can be the autogeneous pressure of the solution at the desired temperature. Optionally, catalysts incorporating metals chosen from among the group comprising Ni, Pd, Ru, Rh, Pt, or other active metals, can be utilized in the hydrothermal gasification process. Heteroatom-containing hydrocarbons also decompose to release smaller molecules such as hydrogen sulfide and ammonia. With proper control of system pressure and temperature, certain small molecular compounds will favor remaining in the liquid water phase, whereas others will partition mostly into the vapor phase. Compounds in the vapor phase, especially $H_2$, CO, and methane, can be readily separated and recovered for beneficial downstream use as syngas which can be used in a variety of ways. With further reduction in pressure, dissolved gaseous constituents in the liquid phase such as $CO_2$ and others can be recovered in subsequent down-stream stages. After gas removal, the now hydrocarbon-depleted water from the hydrothermal gasification process can be recycled to step a) of the present CFP process and used as washing fluid.

Figure 4:
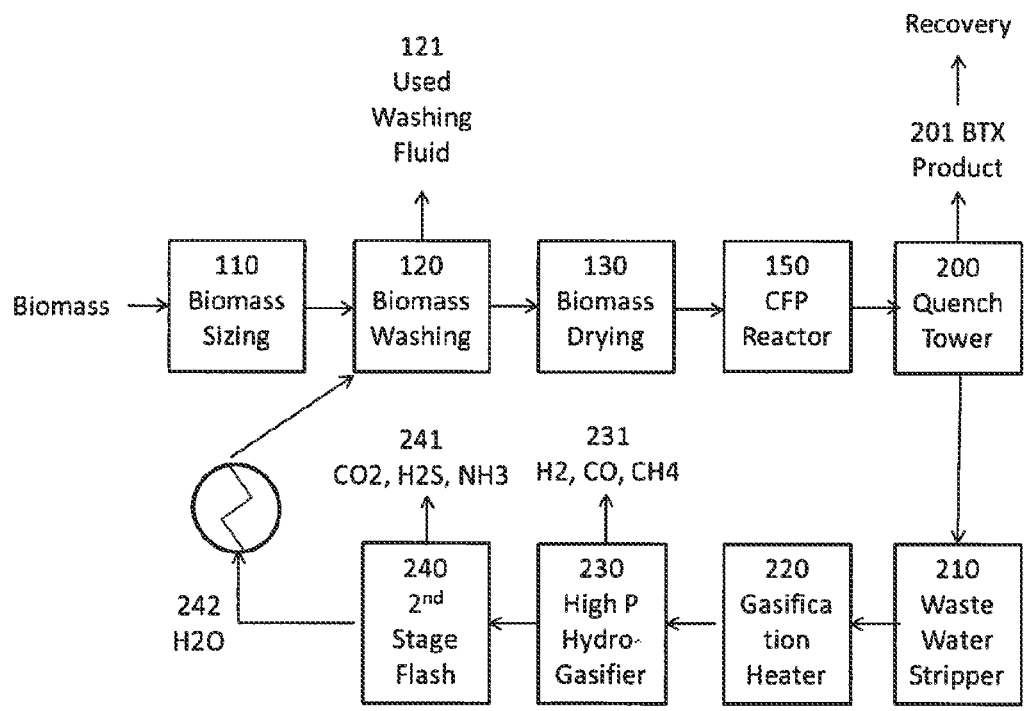
FIG. 4 is a block flow illustration of an embodiment of the present process.

Referring more particularly to FIG. 4, a biomass feed is transported to a sizing system (110) where it is sized to the size desired for further processing as described above. In some embodiments the biomass fed to washing step 2) is processed as a batch, semi-continuously fed, or continuously fed to the process. The feed is washed in washing system (120) with, for example, recycled water (242), dried in drying system (130), optionally sized in a second size reduction step (not shown), and then fed to the CFP process reactor (150). The products of the CFP process are cooled by heat exchange (not shown) and then quenched with water or a hydrocarbon fluid in a quench tower (200). The water recovered in the quench tower can be cooled and recycled (not shown) as quench water. The vapor recovered from the quench tower including BTX (201) and other products is passed to a recovery and purification section (not shown). A portion of the water from the quench tower is stripped in stripper (210), optionally by heating, and a portion of the stripped water is heated in heater (220) and introduced into the high pressure hydro-gasification reactor (230). The gases produced in the gasification reactor (230), including $H_2$, CO and $CH_4$ (231) are separated and recovered. The liquid phase from the gasification reactor (230) is cooled, depressurized, and passed to a second stage flash tank (240) where $CO_2$, $H_2S$ and $NH_3$ (241) are recovered in the vapor phase. The water (242) remaining from the flash tank (240) is cooled and can be recycled to the biomass washing system (120) as a component in a washing fluid.

In an embodiment, the CFP process water is purified for recycle to the biomass washing system (120) by contacting it with char produced in the CFP process. In some embodiments the char that has been contacted with the process water can be gasified to form CO, $H_2$, $CO_2$, and other materials. Char gasification can include an oxygen containing gas such as air or oxygen in order to accelerate the process by the exothermic oxidation reactions.

In some embodiments, for example when solid hydrocarbonaceous biomass materials are used, moisture may optionally be removed from the biomass feed composition prior to being fed to the reactor, e.g., by an optional dryer (130). Removal of moisture from the feed stream may be advantageous for several reasons. For example, the moisture in the feed stream may require additional energy input in order to heat the feed to a temperature sufficiently high to achieve pyrolysis. Variations in the moisture content of the feed may lead to difficulties in controlling the temperature of the reactor. In addition, removal of moisture from the feed can reduce or eliminate the need to process the water during later processing steps.

In some embodiments, the washed biomass for a CFP process may be treated by torrefaction or other mild drying process to dry the biomass before being fed to the CFP reactor. In torrefaction biomass is typically heated from 200 to 350° C. for from 3 to 60 minutes in an oxygen deficient atmosphere. Depending on the conditions and nature of the biomass anywhere up to about 25% of the mass is removed comprising water, CO, $CO_2$, and some light oxygenates. A condensed phase may be recovered from torrefaction that comprises light oxygenates. The light oxygenates typically comprise acetic acid and formic acid, and may contain traces of methanol, lactic acid, furfural, propionic acid, 1-hydroxy-2-propanone, 4-ethyl-2-methoxyphenol, guaiacol, eugenol, isoeugenol, vanillin, phenol, 4-methyl guaiacol, p-ethylguaiacol, o-propylguaiacol, guaiacyl acetone, propioguaiacone, dihydroconiferyl alcohol and hydroxyacetone. The pH of the condensed phase recovered from the torrefaction step is typically less than 5, and often less than 3. In some embodiments at least a portion of the condensate recovered from torrefaction may be used as part of the washing fluid for the washing step to substantially remove the minerals from the biomass. In some embodiments at least a portion of the condensate recovered from torrefaction may be fed to the CFP reactor. The drying system (130) could be conducted on the biomass when it is still in larger pieces and before it is ground to the final size for feed to the CFP process. The washing system (120) could comprise a wet milling step with the condensate from the thermal treatment step or other washing fluid and it could be conducted at elevated temperatures of at least 50, or at least 75 or at least 90° C. It is possible that the milling procedure could provide the heat such that little or no additional heat is needed to reach the temperature of optimal impurity removal. In some embodiments the hot waste water from the washing step is used in a heat exchanger to heat fresh wash solution used for washing.

In some embodiments, the biomass composition may be dried until it comprises less than about 20, less than about 15, less than about 10, or less than about 5% water by weight. Suitable equipment for use in drying system (130) capable of removing water from the composition is known to those skilled in the art. For example, the dryer system (130) comprises an oven heated to a particular temperature (e.g., at least about 80, at least about 100, or at least about 150° C., or higher) through which the biomass composition is continuously, semi-continuously, or periodically passed. For another example, the dryer system (130) may comprise a vacuum chamber into which the biomass composition is processed as a batch. Other embodiments of the dryer system (130) may combine elevated temperatures with vacuum operation.

For biomass pretreatment by washing, rinsing, and drying, the energy requirements will include energy required to pump and heat large volumes of wash and rinse solutions and to heat the biomass to washing temperature. The pressure of the washing process will be near atmospheric so that the pumping energy will be small; as a first approximation it can be ignored. However, heating large volumes of wash and rinse solutions and biomass to the operating temperature requires a significant amount of energy because the quantities of material are substantial.

To improve the economic viability of the overall biomass pretreatment process it is necessary to optimize the conditions of the washing, rinsing, and drying steps with respect to their energy usage while simultaneously taking into account their efficacy in the removal of AAEMs. The energy and efficacy requirements for the washing, rinsing, and drying steps can be in conflict. For example, the washing step is more effective in removing AAEMs at higher temperatures and with larger wash solution/biomass ratios, but the energy requirements are greater at higher temperatures and with larger wash solution/biomass ratios. Therefore an optimization function is needed that considers all the important process variables.

Among the factors that must be considered are: the moisture and AAEMs content in the incoming biomass, the target moisture and AAEMs contents of the biomass feed to the reactor, the temperatures of the washing, rinsing, and drying steps, the pH of the wash and rinse solutions, the AAEMs concentrations in the wash and rinse solutions, and the solution/biomass ratios of the washing and rinsing steps. Generalized optimization functions for the energy used in the process (E) and concentration of AAEMs in the biomass feed to the reactor ([AAEMS]) may appear as:

$$E = f1 \{T\text{ wash1}, T\text{ wash2}, T\text{ rinse}\}^*f2 \{\text{wash/biomass ratio}\}^*f3 \{\text{rinse/biomass ratio}\}^*f4 \{\text{final \% } H_2O\}^*f5 \{\text{initial AAEMs}\}^*f6 \{\text{AAEMs target K, Ca, Na}\}$$

$$[AAEMS] = f7 \{T\text{ wash1}, T\text{ wash2}, T\text{ rinse}\}^*f8 \{\text{wash/biomass ratio}\}^*f9 \{\text{rinse/biomass ratio}\}^*f10 \{\text{initial AAEMs}\}^*f11 \{\text{AAEMs target K, Ca, Na}\}^*f12 \{\text{pH wash, pH rinse}\}^*f13 \{\text{AAEMs wash, AAEMs rinse}\}$$

The challenge is to simultaneously minimize both the E and [AAEMS]. Graphs show that some of the dependencies are non-linear. For example, reducing moisture content to below 40% incoming moisture, and preferably less than 25% incoming moisture, would save a lot of energy. However, one very important parameter to be obtained is the enthalpy of water vaporization when the water is contained in biomass. It is known that the heat of vaporization of water in biomass is greater than that of pure water due to the interaction of water with the biomass matrix that inhibits water vaporization. In addition to understanding how to conserve energy and integrate the heating steps in an efficient manner, one must take into account other engineering practices such as avoiding acidic flue gas condensates, proper boiler operation, heat transfer coefficients, fouling coefficients, cooling tower limitations, etc.

For a target moisture content of 6% in the biomass resulting from the pretreatment process a), in order to dry the incoming biomass to 50, 40, 30, 20, or 6% moisture, the amount of energy that is used to dry the biomass is calculated to be 12, 8, 5, 3, and 0%, respectively, of the energy contained in the raw biomass. For a wash solution/biomass ratio of 5:1, in order to heat the wash solution for a single wash to 70, 60, 50, or 40° C., the amount of energy that is used to heat the wash solution is calculated to be 7, 6, 4, and 3%, respectively, of the energy contained in the raw biomass. With a fixed wash temperature of 50° C., if the wash solution/biomass ratio is 10, 9, 8, 7, 6, 5, the amount of energy that is used to heat the wash solution for a single wash step is 10, 8, 7, 5, 4%, respectively, of the energy contained in the raw biomass. The energy used to perform the heating and drying steps can be obtained from various sources, including energy from sources external to the process, i.e. natural gas, electricity, etc., or preferably the required energy is provided by recovery from one or more of the energy producing processes in the CFP process.

The biomass feed treated in step a) of the present invention has reduced concentrations of AAEMs, nitrogen, and/or sulfur compared to the as-received biomass material. In one embodiment the concentration of K is reduced by at least 25%, or at least 50%, or at least 75%, or preferably at least 90%, or most preferably at least 95%, for example from 25 to 99%, or from 25 to 100%, of its original concentration in the as-received dried biomass. In another embodiment the concentration of Ca is reduced by at least 10%, or at least 20%, or at least 50%, or at least 65%, or at least 80%, or preferably at least 95%, for example from 10 to 99%, or from 10 to 100%, of its original concentration in the as-received dried biomass. In another embodiment the concentration of AAEMs taken together is reduced by at least 25%, or at least 45%, or at least 50%, or at least 75%, or at least 90%, or preferably at least 95%, for example from 25 to 99%, or from 25 to 100%, of their collective concentrations in the as received dried biomass. In another embodiment the concentration of chlorine in the treated biomass is reduced by at least 10%, or at least 20%, or at least 50%, or at least 90%, for example from 10 to 100%, from its concentration in the as-received biomass. In another embodiment the concentration of sulfur in the treated biomass is reduced by at least 5%, or at least 10%, or at least 20%, or at least 30%, for example from 5 to 90%, or from 5 to 50%, from its concentration in the as-received biomass. In another embodiment the concentration of nitrogen in the treated biomass is reduced by at least 1%, or at least 5%, or at least 9%, for example from 1 to 90%, or from 1 to 50%, from its concentration in the as-received biomass.

In various embodiments the treated biomass produced in step a) comprises ≤5,000, ≤1,000, ≤500, or ≤100, or ≤50, or most preferably ≤25 ppm, or from 0.1 to 100, or from 0.1 to 50, or from 0.1 to 25, or from 5 to 25 ppm of potassium; or ≤15,000, ≤10,000, ≤5,000, ≤2,000, ≤1,100, ≤1,000, or most preferably ≤600, or from 0.1 to 1,500, or from 0.1 to 1100, or from 0.1 to 600, or from 10 to 1500, or from 10 to 600 ppm of calcium; or ≤15,000, ≤10,000, ≤5,000, ≤2,000, ≤1,100, ≤1000, or ≤625 ppm of total AAEMs; or ≤15,000, ≤10,000, ≤5,000, ≤2,000, ≤1,000, ≤500, ≤250, or ≤100 ppm of chlorine; or ≤15,000, ≤10,000, ≤5,000, ≤2,000, ≤1,000, ≤500, or ≤200 ppm of sulfur; or ≤5, ≤3, ≤2, ≤1.5, ≤1.1, ≤1.0, ≤0.5, or ≤0.2% by weight of nitrogen, or some combination thereof.

In some embodiments of the invention the washed biomass substantially retains its structural integrity and composition with respect to cellulose and hemicellulose contained therein. The mass ratio of cellulose to hemicellulose can be used as an indicator of the retention of the biomass components. The mass ratio of cellulose to hemicellulose will typically increase as the more reactive hemicellulose reacts and is lost from the biomass. In some embodiments of the invention the mass ratio of cellulose to hemicellulose in the washed biomass compared to that found in the untreated biomass has changed by no more than 10%, or 7%, or 5%, or 2%, or from 0.01% to 10%, or from 0.1% to 5%. In some embodiments the mass ratio of cellulose to hemicellulose is no more than 1.5, or no more than 1.75, or no more than 1.9, or no more than 1.95 in the washed biomass of step a).

In some embodiments of the invention the washed biomass loses only a very small amount of the organic matter in the raw biomass during the washing process of step a). In some embodiments the mass percent of organic matter lost in the process of step a) is ≤10%, or ≤8%, or ≤5%, or ≤4%, or ≤3%, or ≤2%, or ≤1%, or ≤0.5%, or ≤0.3%, or ≤0.2%, or from 0.01% to 5%, or from 0.01% to 3%, or from 0.01% to 1% of the mass of organic material in the raw biomass, as measured by chemical oxygen demand (COD) of the wash and rinse solutions.

In some embodiments of the invention the washed biomass exhibits a significantly increased BET (Brunauer-Emmet-Teller) surface area compared to the unwashed material as measured by adsorption of non-corrosive gases (e.g. nitrogen, argon, carbon dioxide, etc.) as adsorbates to determine the surface area, as is well known in the art. In some embodiments the treated biomass BET surface area is at least 10, or at least 20, or at least 30, or at least 40, or from 10 to 200, or from 20 to 100 $m^2/g$. In some embodiments the BET surface area of the washed biomass is at least 1.5, or at least 2, or at least 3, or at least 4, or from 1.1 to 10, or from 1.5 to 5 times the BET surface area of the unwashed material.

In some embodiments of the invention the washed biomass exhibits a significantly increased pore volume compared to the unwashed material as measured by standard gas adsorption or mercury intrusion techniques, as are well known in the art. In some embodiments the treated biomass pore volume is at least 0.05, or at least 0.1 or at least 0.15, or at least 0.2, or from 0.01 to 0.5, or from 0.01 to 0.3 cc/g as measured by gas adsorption. In some embodiments of the invention the pore volume of the washed biomass is at least 1.5, or at least 2, or at least 3, or at least 4, or from 1.1 to 10, or from 1.1 to 5 times the pore volume of the untreated biomass.

In some embodiments, a control function of the biomass washing step 2) is utilized wherein the process parameters of the washing step are controlled as a function of the AAEMs concentration of the washed biomass or the used washing fluid, or as a function of the pH of the used washing fluid. The relative mass flow of the washing fluid compared to the mass flow of the biomass may be controlled as a function of the AAEMs concentration of the washed biomass or the used washing fluid. The temperature of the washing process may be controlled as a function of the AAEMs concentration of the washed biomass or the used washing fluid. The washing process may be controlled as a function of any of the individual AAEMs elements, i.e. potassium, calcium, sodium, magnesium, iron, copper, zinc, manganese, silicon, phosphorus, aluminum, sulfur, or nitrogen, or some combination thereof as found in the washed biomass or in the used wash fluid. Control concentration targets for the AAEMs, sulfur, or nitrogen to be used as the control function are easily determined by experiment. The concentration of AAEMs, sulfur or nitrogen on the catalyst fed to or exiting the CFP process reactor or regenerator may be used to control the washing process. The Brønsted acid site density of the catalyst fed to or exiting the CFP process may be used to control the washing process. The concentration of sulfur or nitrogen in the process exhaust gas or liquid effluent may be used to control the washing process.

It is noted that AAEMs in the used washing fluid may be used as fertilizer. The used washing fluid may be used without further treatment or may have its pH adjusted. The used washing fluid may be concentrated by evaporation, osmosis, membrane separation, distillation, ion exchange, or other water treatment to recover purified water and the concentrated used fluid may be applied as fertilizer. The AAEMs may be recovered as concentrated brine solution, or solids or slurry from the used washing fluid and used alone or in a mixture as fertilizer. The recovered washing fluid may be used as fertilizer-containing irrigation water for agriculture, forestry, or residential use. Advantages of using the washing fluid as fertilizer include the minimization or elimination of the water treatment facility, increased soil fertility, and reduction of the disposal costs for the mineral elements. Another advantage is that the composition of the AAEMs in the used washing fluid comprises precisely those nutrients that are most useful in agriculture for promoting plant growth and the need to purchase fertilizers is minimized.

The CFP reactor 150 of FIG. 4 (step b)) may be operated at a temperature from 300 to 1000° C., and the raw fluid product stream from reactor 150 is typically at a temperature of 300 to 620° C., such as 400 to 575° C., for example 500 to 550° C., and a pressure of 100 kPa to 1500 kPa, such as 200 kPa to 1000 kPa, for example 300 kPa to 700 kPa (pressures expressed as absolute pressures). The raw fluid product stream from reactor 150 comprises aromatics, olefins, oxygenates, paraffins, $H_2$, $CH_4$, CO, $CO_2$, water, char, ash, coke, catalyst fines, water soluble organics and heavy organics, and a host of other components. On a water-free and solids-free basis the raw fluid product stream can comprise 20 to 60%, such as 25 to 55%, for example 30 to 50% CO; 10 to 50%, such as 15 to 40%, for example 20 to 35% $CO_2$; 0.1 to 10%, such as 0.2 to 5%, for example 0.3 to 1.0% $H_2$; 2 to 15%, such as 3 to 10%, for example 4 to 8% $CH_4$; 2 to 40%, such as 3 to 35%, for example 4 to 30%, BTX; 0.1 to 10%, such as 0.2 to 5%, for example 0.3 to 3% oxygenates; and 1 to 15%, such as 2 to 10%, for example 3 to 6% $C_2$-$C_4$ olefins. On a water-free and solids-free basis the raw fluid product stream can comprise a vapor mixture where the sum of CO and $CO_2$ is 30 to 90%, such as 40 to 85%, for example 50 to 80%. All of these are on a mass percent basis.

The vapor/liquid separation system (step d)) of the present process may include unit operations known to effectively accomplish separation of the fluid product stream of step c) into a liquid phase stream comprising components selected from the group consisting of water, char, coke, ash, catalyst fines, water soluble organics and heavy organics, and combinations thereof, and a vapor phase stream comprising benzene, toluene and xylenes. Embodiments of such unit operations include venturi, quench systems, compressors, condensers, chillers, absorption systems, scrubbers, demisters, or combinations of these.

Quenching with water or organic liquids in the vapor/liquid separation system in quench tower 200 (step d)) may be conducted at conditions of temperature from −5 to 200° C., such as from 10 to 100° C., for example from 40 to 80° C., and pressure of 150 to 1500 kPa, for example from 300 to 700 kPa. The vapor product resulting from such a water or organic liquids quenching step may then be compressed at conditions of 100 to 8000 kPa, for example 600 to 2000 kPa, and then cooled at conditions of −30 to 60° C., for example 5 to 30° C.

The solids separation and stripping system (step c)) of the present process may include unit operations known to effectively separate entrained catalyst and certain other components from the raw fluid product stream of the CFP process. That raw fluid product stream may comprise entrained catalyst, catalyst fines, char, coke, ash, water, $C_9^+$ aromatics, oxygenates, benzene, toluene, xylenes, CO, $CO_2$, $CH_4$, $N_2$, $H_2$, $C_2$-$C_4$ olefins and paraffins, and other compounds. Embodiments of such unit operations include one or more cyclones (such as, for example, in series), screens, filters, or some combination of these. In one embodiment the solids separation and stripping system of step c) comprises a cyclone or series of cyclones, the vapor/liquid separation system of step d) comprises venturi systems, quench systems, compressors, condensers, chillers, absorption systems, scrubbers, demisters, or combinations thereof, and the product recovery system of step e) comprises compressors, condensers, chillers, absorption systems, demisters, or combinations thereof.

The product recovery system (step e)) of the present process may include unit operations known to effectively accomplish separation and recovery of benzene, toluene, xylenes and other aromatic compounds from the vapor phase of step d). Embodiments of such unit operations include compressors, condensers, chillers, absorption systems, demisters, or combinations of these.

The following Examples demonstrate the present invention and its capability for use. The invention is capable of other and different embodiments, and its several details are capable of modifications in various apparent respects, without departing from the spirit and scope of the invention. Accordingly, the Examples are to be regarded as illustrative in nature and not as restrictive. All percentages are by weight unless otherwise indicated.

EXAMPLE 1

*Miscanthus* pellets obtained commercially were ground to pass through a 20 mesh sieve (0.841 mm) A 21.4 g sample of the ground *miscanthus* pellets was rinsed using deionized (DI) water until the resulting wash water appeared colorless. Approximately 500 ml of DI water was used so the mass of wash solution to mass of biomass was approximately 25:1. The washed sample was separated by filtration and dried in a pan at 105° C. in an oven overnight. Samples of the unwashed ground material and of the dried water washed material were sent to an independent laboratory for elemental analysis. The ash content of the remainder of the sample was determined following the NREL protocol described in "Determination of Ash in Biomass" NREL/TP-510-42622 for determination of ash.

Elemental analyses of ground unwashed *miscanthus* and water washed and dried *miscanthus* results are shown below in Table 1.

TABLE 1

|  | Ground | Water Washed | Difference, % |
|---|---|---|---|
| K (ppm) | 11,551 | 477 | −95.9 |
| Ca (ppm) | 4,400 | 4,516 | 2.6 |
| S (ppm) | 1,584 | 968 | −38.9 |
| Cl (ppm) | 1,232 | 494 | −59.9 |
| C (%) | 47.57 | 48.83 | 2.6 |
| H (%) | 6.34 | 6.22 | −1.9 |

EXAMPLE 2

Catalytic fast pyrolysis (CFP) experiments were conducted in a fluidized bed reactor. The fluidized bed reactor was 4 inches (10 cm) in size (ID) and 22 inches (55 cm) in height and was made of "316" stainless steel. Inside the reactor, the catalyst bed, comprising ZSM-5, was supported by a distributor plate made of perforated "316" stainless steel. Hardwood pellet biomass was obtained and a portion of the ground hardwood pellets (46.99% C, 870 ppm K, 1500 ppm Ca, as measured by ICP, total AAEMs 2370 ppm) was weighed and loaded into a hopper and its flow rate was controlled by an augur inside the hopper that delivered the biomass to a feed tube. The hardwood pellets were hammer milled through a ⅛ inch (3.2 mm) screen. The reactor, loaded with 1,525 g of the catalyst prior to the experiment, the catalyst calcined in situ in air at the flow rate of 1.5 standard liters per minute (SLPM) of air and 3.0 SLPM of $N_2$ for 2 hours at 600° C., was purged with a flow of $N_2$ at 3.0 SLPM for 30 minutes prior to starting the biomass conversion.

The reactor was heated to 575° C. and the solid biomass was introduced into the side of the reactor from the feeding tube with $N_2$ flow. Gas flow rate through the biomass feed tube was 3.2 SLPM. The biomass flow rate was adjusted to approximately 9.4 g/minute and 280.6 g of biomass was fed during the 30 minute experiment. During reaction, 2.3 SLPM of $N_2$ was passed into the reactor through the distributor plate to fluidize the catalyst in addition to the feeding tube $N_2$ flow. The product vapors were passed through a cyclone held at 450° C. to remove entrained solids. The effluent exiting the cyclone flowed into a product collection system in which the condensable products were cooled and collected and analyzed by GC, and the remaining vapor products were separately collected and analyzed by GC. The reactor was then flushed an additional 15 minutes with $N_2$ to ensure that the condensable products were swept into the product collection train which includes compressors, condensers, bubblers, and a gas meter, and then allowed to cool. The yield of coke and char were obtained by combusting a small sample of the coked catalyst and char to determine the mass of carbon thereon. The carbon yield of aromatics was determined to be 24.76% of the carbon fed, and the carbon yield of coke and char was determined to be 33.9%.

The catalyst was regenerated by passing 6.0 SLPM of air through the reactor for 2 hours while maintaining the reactor temperature at 688° C. The experimental sequence of catalyzed fast pyrolysis and catalyst regeneration was repeated multiple times. The data from this example are presented in FIGS. 5 and 6.

EXAMPLE 3

The experiment of Example 2 was repeated except with DI water washed biomass as the feed in place of merely sized pellets. A 1 kg sample of the hardwood pellets as used in Example 2 was washed with DI water in a ratio of 24:1 by mass of water:hardwood for one hour at ambient temperature, filtered, and the wash was repeated two more times. The washed hardwood biomass was dried at 100° C. overnight. The washed and dried biomass contained 74 ppm K and 1040 ppm Ca as determined by ICP (total AAEMs 1114 ppm), representing 91.5% removal of K, 30.7% removal of Ca, and 53% removal of total AAEMs from the fresh hardwood. The analysis of the washed and as-received hardwood pellets are presented in Table 2.

TABLE 2

| Analysis of Biomass | As-received hardwood, Example 2 | DI Washed hardwood, Example 3 | Fraction of impurity element removed |
| --- | --- | --- | --- |
| Impurity element | ppm | ppm | % |
| K | 870 | 74 | 91.5 |
| Ca | 1500 | 1040 | 30.7 |

The reactor was loaded with 1536 g of a fresh batch of the same catalyst as used in Example 2. The feed rate was adjusted to 10.8 g/minute and 325.2 g of washed and dried hardwood biomass was fed in a 30 minute experiment. The yield of aromatics was 24.6% of the carbon fed and the yield of coke and char was 38.6%. The experimental cycle of catalyzed fast pyrolysis and catalyst regeneration was repeated multiple times. The data are presented in FIG. 5.

Figure 5:
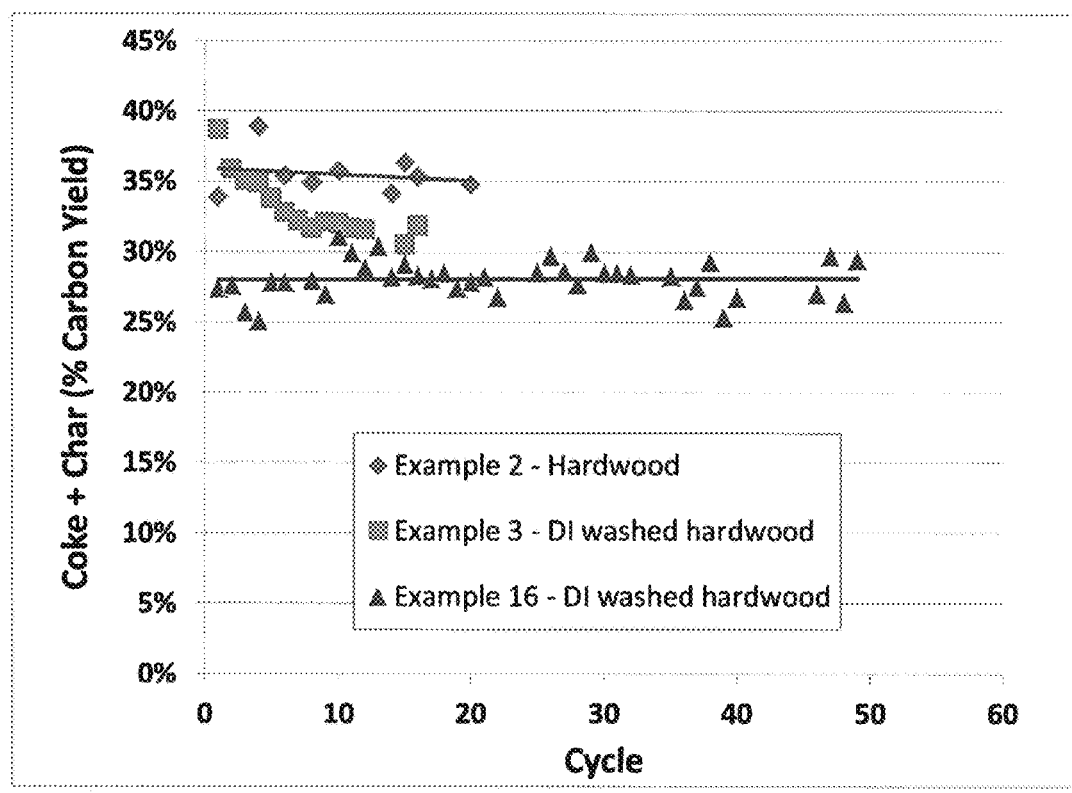
FIG. 5 is a plot of coke+char yield vs. CFP process cycles for treated and untreated biomass feedstock.

FIG. 5 shows the carbon yield of coke plus char as a function of the number of cycles of catalytic pyrolysis and regeneration for experiments using the unwashed hardwood biomass ("Hardwood") as in Example 2 and washed hardwood biomass ("DI Washed Hardwood") as in Example 3. The data in FIG. 5 show that the process that includes a biomass water washing step that reduces the AAEMs content of the hardwood biomass feed results in a process that produces less char plus coke than when the AAEMs content has not been reduced as in the comparative Example 2 with a hardwood biomass feed that has not been washed. Coke and char are less valuable products, so it is an advantage to reduce their yield in a CFP process.

EXAMPLE 4

The experiment of Example 2 was repeated except with commercially obtained cellulose as the biomass feed in place of the hardwood pellets. The reactor was loaded with 1535 g of a fresh batch of the same catalyst as used in Examples 2 and 3. The feed rate was adjusted to 10.8 g/minute and 324 g of cellulose biomass was fed in a 30 minute experiment. During subsequent experiments the cellulose feed rate was adjusted to 10 g/minute or 310 g of cellulose fed during each experiment. The experimental cycle of catalyzed fast pyrolysis and catalyst regeneration was repeated multiple times. The data are presented in FIG. 6.

In FIG. 6 the yields of aromatics are presented as the percentage of carbon fed to the reactor (Carbon % Yield of Aromatics) for Examples 2, 3, and 4 that used hardwood, DI washed hardwood, and cellulose, respectively, as the biomass feed to the CFP process. The data presented in FIG. 6 show that a CFP process that uses a washed biomass feed ("DI Washed Hardwood") that contains 1,114 ppm AAEMs provides higher carbon yields of aromatics which is approximately 10% more aromatics than the experiment with hardwood that has not been washed and contains 2,370 ppm AAEMs. Moreover, the aromatic yield loss per cycle, which is a measure of catalyst deactivation, is 0.14% per cycle for the washed feed compared to the 0.16% yield loss per cycle for unwashed feed. Thus, washing the feed results in a 12% slower deactivation rate than the deactivation rate for unwashed feed. Similarly, a CFP process that uses a feed that contains substantially only cellulose, results in approximately 50% higher yield of aromatics than hardwood, and a deactivation rate of only 0.12% per cycle. Comparison of the results of a CFP process with washed hardwood of Example 3 with a CFP of as-received hardwood of Example 2 demonstrates that the yield of aromatics can be increased and the deactivation of aromatics production can be reduced by reducing the AAEMs content of the feed in a CFP process. Comparison of the results of Example 4 that utilized cellulose with Example 2 that used as-received hardwood as the feed (FIG. 5) demonstrates that the deactivation rate of the CFP process can be further reduced by utilizing a biomass feed that is comprised of cellulose. FIG. 6 also demonstrates that a biomass feed that is substantially comprised of cellulose provides a higher yield of aromatics.

EXAMPLE 5

Wood chips from aspen and birch trees obtained commercially were ground and sieved to provide fractions in size ranges 1.0-2.0 inches (25-51 mm), 0.5-1.0 inches (12.7-25.4 mm), 0.25-0.5 inches (6.4-12.7 mm), and 0.1875-0.25 inches (4.8-6.4 mm) A sample of the 1.0-2.0 inch (25-51 mm) particles of ground hardwood was mixed with warm (80° C.) deionized (DI) water in approximately a 24:1 ratio of water:wood particles and held at 80° C. for 60 minutes. The wood biomass was separated by filtration, and a sample was set aside for analysis. The once-washed wood biomass was washed again using the same procedure to give a twice-washed material. The twice washed wood biomass was washed a third time using the same procedure and a sample was set aside for analysis. The three stage washing protocol was applied to each of the size fractions. Samples of the unwashed material and of the dried, water washed materials were sent to an independent laboratory for elemental analysis. The results of the analysis for potassium are presented in Table 3.

TABLE 3

| Sample | Size Inches (mm) | Wash stage | K ppm | Removal (%) |
|---|---|---|---|---|
| Unwashed Chips | ½"-2" (12.7-25) | na | 707 | na |
| A-1 Chips | 3/16"-¼" (4.8-6.4) | First | 252 | 64% |
| A-3 Chips | (4.8-6.4) | Third | 83 | 88% |
| B-1 Chips | ¼"-½" (6.4-12.7) | First | 311 | 56% |
| B-3 Chips | (6.4-12.7) | Third | 123 | 83% |
| C-1 Chips | ½"-1" (12.7-25) | First | 425 | 40% |
| C-3 Chips | (12.7-25) | Third | 235 | 67% |
| D-1 Chips | 1"-2" (25-51) | First | 324 | 54% |
| D-3 Chips | (25-51) | Third | 263 | 63% |

The results in Table 3 show that a single washing step removes at least 40% of the potassium in the biomass sample, and additional washing steps remove additional potassium. The results in Table 3 show that hardwood biomass that is ground to smaller sizes is more effectively washed to remove potassium in a three step washing procedure.

EXAMPLE 6

A catalytic fast pyrolysis experiment was conducted with the reaction product quenched with water in a Venturi scrubber. The aqueous phase obtained from the scrubber outlet was separated from the organic phase for use in the present experiment. The pH of the aqueous phase was approximately 3.5. A sample of commercially obtained hardwood biomass was ground to pass through a 20 mesh sieve (0.841 mm) A sample of the ground material was washed with the aqueous phase obtained from the venturi scrubber in an approximately 12:1 ratio of aqueous phase: hardwood at room temperature (approximately 25° C.). The solid was separated and the washing repeated two more times for a total of 3 washing steps. A second fraction of ground hardwood biomass was washed 3 times with deionized (DI) water using the same procedure. The washed samples were dried overnight at 105° C. Samples of the washed and unwashed biomass materials were sent to an independent laboratory for elemental analysis. The results of the analysis for potassium and calcium are collected in Table 4.

TABLE 4

| Wash solution | K (ppm) | K removal (%) | Ca (ppm) | Ca Removal (%) |
|---|---|---|---|---|
| Unwashed | 870 | | 1500 | |
| DI water | 74 | 92 | 1040 | 31 |
| Venturi scrubber water | 16 | 98 | 379 | 75 |

The results in Table 4 demonstrate that washing hardwood biomass with venturi scrubber water removes a very substantial portion of the AAEMs (K and Ca) present in hardwood biomass and that washing with venturi scrubber water with a low pH is more effective than washing with deionized water.

EXAMPLES 7, 8, 9, and 10

The scale up of biomass washing was performed in a biomass pretreatment pilot plant that included a chip hopper, a wash tank, a liquor tank, a chip discharge tank, and a chemical make-up tank. A recycle pump was used to recycle the wash liquid between the wash tank and the liquor tank to simulate a CSTR (continuous stirred tank reactor) configuration. The capacity of the wash and liquor tanks was approximately 354 liters (12.5 ft$^3$). The liquor tank was provided with a heater to heat the wash liquid to the desired temperature. The chemical make-up tank held additional fresh wash solution to be added in succeeding cycles.

The biomass used for the Examples 7-10 was loblolly pine obtained from a commercial supplier. The material was obtained as pulp mill chips and microchips that had been produced by comminuting wood logs. The particle size distributions of the pulp mill chips and microchips are summarized in Table 5.

TABLE 5

| | Sieve Fraction (wt %) | | | | | | |
|---|---|---|---|---|---|---|---|
| Sieve range (mm) | >25.4 | 25.4-19.1 | 19.1-15.9 | 15.9-12.7 | 12.7-6.4 | 6.4-3.2 | <3.2 |
| Microchips | 0.93 | 1.51 | 2.91 | 4.66 | 53.08 | 29.34 | 7.57 |
| Pulp mill chips | 54.01 | 26.45 | 13.2 | 2.73 | 2.33 | 0.87 | 0.41 |

EXAMPLE 7

The wash tank was charged with 97.8 lb (dry basis, 44.5 kg) loblolly pine microchips to be washed. The acidified wash solution (0.04% HNO$_3$, pH 2.5) was charged to the liquor tank and heated to the washing temperature (58° C.) over the course of about 45 minutes. Upon reaching the desired temperature the wash solution was transferred to the wash tank and the recirculation pump was started. The wash experiment was continued for 40 minutes. During the wash process the temperature of the wash solution was controlled manually to maintain the temperature within approximately +/−2° C. of the desired temperature. Samples of the wash liquid were taken at 5 minute intervals for analysis.

At the end of the wash period the biomass was drained and transferred to the chip discharge tank. The material was weighed, and a small sample was removed for analysis. A sample of the used wash solution was retained for analysis. The biomass was returned to the wash tank and the cycle was repeated using a fresh portion of acidified wash solution. The process was repeated twice more for a total of three wash cycles. After the final wash cycle the biomass was rinsed with approximately 109 liters (28.9 gallons) of municipal tap water (2 ppm K, 19 ppm Ca, 21 ppm Na, 25 ppm Mg) over the course of two minutes and then removed and dried. The total elapsed time (clock time from the introduction of the wash to the biomass to the time when the biomass is rinsed and separated from the liquids) for the washing and separation of the biomass was 316 minutes. The total contact time of the biomass with the wash solution was 120 minutes. All samples were dried at 105° C. until bone dry.

EXAMPLE 8

The experiment of Example 7 was repeated using a fresh charge of 97.8 lb (dry basis, 44.5 kg) of microchips of loblolly pine and operating the process at 70° C. The total elapsed time (clock time) for the washing and separation of the biomass was 191 minutes. The total contacting time of the biomass with the wash solution was 120 minutes. The BET surface area of the biomass increased from 9 to 42.7 m$^2$/g after washing, and the pore volume of the biomass increased from 0.049 cc/g to 0.212 cc/g after washing.

EXAMPLE 9

The experiment of Example 7 was repeated using a fresh charge of 150.4 lb (68.4 kg) of microchips of loblolly pine and a 6:1 mass ratio of wash solution to biomass at 70° C. The total elapsed time (clock time) for the washing and separation of the biomass was 266 minutes. The total contacting time of the biomass with the wash solution was 120 minutes.

EXAMPLE 10

The experiment of Example 8 was repeated except the microchips were replaced by 119.2 lb (54.2 kg) of the larger pulp mill chips that had not been dried to bone dryness. The analytical data comparing the microchips and pulp mill chip washings are collected in Table 7 below. The total elapsed time (clock time) for the washing and separation of the biomass was 220 minutes.

The total contacting time of the biomass with the wash solution was 120 minutes.

Table 6 summarizes the conditions for the wash tests in Examples 7 through 10.

TABLE 6

| Example | Temp, ° C. | Water/Biomass Ratio (wt/wt) | Wash time, min/cycle | pH | Biomass Loblolly Pine |
|---|---|---|---|---|---|
| 7 | 58 | 10 | 40 | 2.5 | Microchips |
| 8 | 70 | 10 | 40 | 2.5 | Microchips |
| 9 | 70 | 6 | 40 | 2.5 | Microchips |
| 10 | 70 | 10 | 40 | 2.5 | Pulp mill chips |

The results in Table 7 demonstrate that as much as 88% of the potassium and 30% of the calcium can be removed from larger particles of biomass in a three cycle washing protocol using acidified water. The results demonstrate that more washing cycles remove more K and Ca than fewer cycles. The results demonstrate that using smaller particles (Example 8) enables a larger fraction of K and Ca to be removed than when larger particles are used (Example 10). The data from the rinse of the washed large particles with municipal tap water show that the large particles can experience an increase in calcium content even when the rinse water contains as little as 19 ppm of calcium.

TABLE 7

| | Example 8 | | | | Example 10 | | | |
|---|---|---|---|---|---|---|---|---|
| Chip size | Microchips | | | | Pulp mill chips | | | |
| Temp (° C.) | 70 | | | | 70 | | | |
| Wash to biomass mass ratio | 10:1 | | | | 10:1 | | | |
| | K | | Ca | | K | | Ca | |
| | ppm | removal | ppm | removal | ppm | removal | ppm | removal |
| Untreated | 589 | — | 608 | — | 561 | — | 635 | — |
| First cycle | 134 | 77% | 423 | 30% | 228 | 59% | 635 | 0.1% |
| Second cycle | 29 | 95% | 254 | 58% | 133 | 76% | 540 | 15.1% |
| Third cycle | 13 | 98% | 166 | 73% | 69 | 88% | 441 | 30.5% |
| Rinse | 21 | 96% | 187 | 69% | 61 | 89% | 711 | −11.8% |

Table 8 summarizes the results of the elemental analyses by Inductively Coupled Plasma (ICP) atomic emission elemental analysis for potassium of the samples of biomass that had been washed and rinsed. The data indicate that a higher temperature or a larger wash solution to biomass ratio removes more potassium in the first wash cycle. In subsequent wash cycles the impact is of higher temperature or larger wash solution to biomass ratio is smaller. The data indicate that a multi-cycle wash protocol removes at least 90% of the potassium, and a wash cycle with 3 cycles removes at least 96% of the potassium in biomass. The data for the biomass rinsed with municipal tap water can experience an increase in potassium content even when the rinse water contains as little as 2 ppm of potassium.

TABLE 8

|  | Example 7 | | Example 8 | | Example 9 | |
|---|---|---|---|---|---|---|
| Temp ° C. | 58 | | 70 | | 70 | |
| Wash to Biomass mass ratio | 10:1 | | 10:1 | | 6:1 | |
|  | K | | K | | K | |
|  | ppm | removal | ppm | removal | ppm | removal |
| unwashed | 589 | — | 589 | — | 589 | — |
| First cycle | 189 | 68% | 134 | 77% | 213 | 64% |
| Second cycle | 38 | 94% | 29 | 95% | 61 | 90% |
| Third cycle | 15 | 97% | 13 | 98% | 23 | 96% |
| Rinse | 25 | 96% | 21 | 96% | 31 | 95% |

Table 9 summarizes the results of the elemental analyses by ICP for calcium of the samples of biomass that had been washed and rinsed. The data indicate that a higher temperature or a larger wash solution to biomass ratio removes more calcium in the first wash cycle and in subsequent wash cycles. The data indicate that a multi-cycle wash protocol removes at least 39% of the calcium, and a wash cycle with 3 cycles removes at least 59% of the calcium in biomass. The data for Example 8 show that 73% of the calcium in biomass can be removed by a 3 step wash cycle using acidified water at 70° C. and a 10:1 wash solution to biomass ratio. The data for the biomass rinsed with municipal tap water can experience an increase in calcium content even when the rinse water contains as little as 19 ppm of calcium.

TABLE 9

|  | Example 7 | | Example 8 | | Example 9 | |
|---|---|---|---|---|---|---|
| Temp ° C. | 58 | | 70 | | 70 | |
| Wash to Biomass mass ratio | 10:1 | | 10:1 | | 6:1 | |
|  | Ca | | Ca | | Ca | |
|  | ppm | removal | ppm | removal | ppm | removal |
| unwashed | 608 | — | 608 | — | 608 | — |
| First cycle | 496 | 18% | 423 | 30% | 448 | 26% |
| Second cycle | 325 | 47% | 254 | 58% | 372 | 39% |
| Third cycle | 211 | 65% | 166 | 73% | 250 | 59% |
| Rinse | 253 | 58% | 164 | 73% | 326 | 46% |

The used wash samples from Examples 7 through 10 were filtered through a 1.5 micron glass fiber filter and analyzed for their chemical oxygen demand (COD). The COD is the amount of oxygen required to oxidize all organic compounds in a solution to carbon dioxide, ammonia, and water. COD has units of mg/L, i.e. mg of oxygen consumed per liter of sample analyzed. For the calculation the liter of solution is assumed to have a mass of 1000 g, so the COD becomes units of mg/1000 g solution, or simply ppm. In order to calculate the organic loss from COD number, all organic compounds lost with waste water stream are assumed to have a formula of $C_n(H_2O)_n$. The following formula was used:

Organic loss=COD/(MW of $O_2$)*(MW of $C_n(H_2O)_n$)*wash/biomass ratio where MW is molecular weight. The organic loss percentages for each wash cycle are summarized in Table 10. The data in Table 10 demonstrate that the 3-step washing procedure of Examples 7 through 10 removes only very small amounts of organic matter from biomass, in some cases less than 0.5% of the organic matter.

TABLE 10

| Example | Stage | COD (mg/L) | Organic loss (wt %) |
|---|---|---|---|
| 7 | 1 | 215 | 0.20% |
| 7 | 2 | 112 | 0.11% |
| 7 | 3 | 106 | 0.10% |
| 7 | Total |  | 0.41% |
| 8 | 1 | 646 | 0.61% |
| 8 | 2 | 136 | 0.13% |
| 8 | 3 | 127 | 0.12% |
| 8 | Total |  | 0.86% |
| 9 | 1 | 145 | 0.08% |
| 9 | 2 | 146 | 0.08% |
| 9 | 3 | 65 | 0.04% |
| 9 | Total |  | 0.20% |
| 10 | 1 | 103 | 0.10% |
| 10 | 2 | 132 | 0.12% |
| 10 | 3 | 89 | 0.08% |
| 10 | Total |  | 0.30% |

EXAMPLES 11, 12, and 13

The following examples further illustrate the present invention. In each of these experiments, 2.0-2.5 kg of biomass was contacted with a 0.04 wt % $HNO_3$ solution (pH=2.5) in a heated stirred vessel for 40 minutes. The biomass was separated from the solution and contacted with a fresh mild acid wash solution two additional times for a total of three treatments under the same conditions with the same procedure. After the third treatment cycle, the biomass was washed with deionized water. Mineral analyses were performed by ICP.

EXAMPLE 11

Loblolly (soft yellow) pine chips having longest dimensions of ≥25 mm and containing 412 ppm K were used to prepare ultra-low K biomass. A 10:1 wash solution:biomass mass ratio was used at 40° C. The biomass was separated and dried at 105° C. overnight. The analytical data for the thrice washed and dried biomass are given in Table 11 below.

EXAMPLE 12

Yellow birch chips having longest dimensions of 10-12 mm and containing 454 ppm K were used to prepare ultra-low K biomass. A 10:1 wash solution:biomass mass ratio was used at 60° C. The biomass was separated and dried at 105° C. overnight. The analytical data are given in Table 11 below.

EXAMPLE 13

Yellow birch chips having longest dimensions of ≤10 mm and containing 454 ppm K were used to prepare ultra-low K biomass. A 10:1 solution:biomass ratio was used at 60° C. The analytical data are given in Table 11.

TABLE 11

(Mineral Analyses by ICP for Ultra-Low K Biomass)

| Example | Biomass | Particles | Wash cycles | K ppm | K Removal % | Ca ppm | Ca Removal (%) |
|---|---|---|---|---|---|---|---|
| 11 | Loblolly pine | ≥25 mm | None | 412 | — | 500 | — |
| 11 | Loblolly pine | ≥25 mm | 3 | 22 | 95 | 114 | 77 |
| 12 | Yellow Birch | 10-12 mm | None | 454 | — | 800 | — |
| 12 | Yellow Birch | 10-12 mm | 1 | 207 | 54 | 592 | 26 |
| 12 | Yellow Birch | 10-12 mm | 2 | 48 | 89 | 469 | 41 |
| 12 | Yellow Birch | 10-12 mm | 3 | 22 | 95 | 201 | 75 |
| 13 | Yellow Birch | ≤10 mm | None | 454 | — | 800 | — |
| 13 | Yellow Birch | ≤10 mm | 1 | 94 | 79 | 543 | 32 |
| 13 | Yellow Birch | ≤10 mm | 2 | 30 | 93 | 206 | 74 |
| 13 | Yellow Birch | ≤10 mm | 3 | 22 | 95 | 143 | 82 |

The results in Table 11 show that multiple stage extraction of hard and soft woods under mild conditions of temperature and for modest time periods successfully produce biomass feedstocks having ultra-low K content. The results in Table 11 also demonstrate that fewer than 3 stages under the conditions provided are not sufficient to reduce the K content to the desired level of ≤25 ppm.

COMPARATIVE EXAMPLE 1

Hardwood pellets were ground to an average particle size of approximately 1 mm and subjected to three stages of washing with deionized (DI) water (no added acid) at 80° C. for 60 minutes per stage. The resulting biomass was analyzed by ICP for mineral content. The results are summarized in Table 12. The results demonstrate that three stages of washing with DI water could not achieve the target K content of less than or equal to 25 ppm K.

COMPARATIVE EXAMPLE 2

Pine pellets were ground to an average particle size of approximately 1 mm and subjected to three stages of washing with DI water (no added acid) at 80° C. for 60 minutes per stage. The resulting biomass was analyzed by ICP for mineral content. The results are summarized in Table 12. The results demonstrate that three stages of washing with DI water could not achieve the target K content of less than or equal to 25 ppm K.

COMPARATIVE EXAMPLE 3

Loblolly pine microchips were washed in a 1 liter capacity round bottom flask that was rotated slowly in a hot bath and fitted with a water cooled condenser. The flask was filled with 10% by mass acetic acid washing solution and heated to 90° C. A 50 g sample of the biomass was added to the solution (wash:biomass ratio 10:1) and the experiment was conducted for 120 minutes. At the end of the experiment the solids were separated by filtration and rinsed twice with DI water. The acetic acid washed microchips were dried at 105° C. and analyzed by ICP analysis. The results are summarized in Table 12. The results demonstrate washing with hot acetic acid could not achieve the target K content of less than or equal to 25 ppm K.

The results in Table 12 demonstrate that washing either a hard (hardwood) or soft (pine) wood with very small particle size (1 mm) and multiple cycles of DI water washing under mild conditions, or washing with hot acetic acid, the desired concentration of K (≤25 ppm) was not reached. This shows that conventional biomass washing conditions are not suitable for providing ultra-low K content biomass for a biomass upgrading process.

TABLE 12

(Wash Results for Comparative Examples 1, 2 and 3)

| Comp. Example | Biomass | Wash Cycles, Solution | Cycle time min. | Temp ° C. | K ppm | K removal % | Ca ppm | Ca removal % |
|---|---|---|---|---|---|---|---|---|
| 1 | Ground hardwood pellets | None | — | — | 870 | — | 1500 | — |
| 1 | Ground hardwood pellets | 3 DI water | 60 | 80 | 90 | 90 | 1040 | 31 |
| 2 | Ground pine pellets | None | — | — | 600 | — | 900 | — |
| 2 | Ground pine pellets | 3 DI water | 60 | 80 | 52 | 91 | 552 | 39 |
| 3 | Loblolly pine microchips | None | — | — | 589 | — | 608 | — |
| 3 | Loblolly pine microchips | 1 acetic acid | 120 | 90 | 59 | 90 | 116 | 81 |

EXAMPLES 14 and 15

In order to determine whether the chemical composition of wood, especially its primary components, cellulose, hemi-cellulose, and lignin (e.g. CHL), which compositional integrity is required for converting biomass into desired products by the CFP process was affected by the wash treatment, a detailed chemical analysis that quantifies the individual CHL components was performed on the starting and washed biomass. In the chemical analyses, samples of the non-washed and thrice washed materials were treated prior to analysis to remove non-CHL components that could potentially interfere with subsequent chemical analyses. To remove the non-CHL components, first, an aliquot of each sample was milled and extracted with dichloromethane (DCM) to remove soluble substances such as fats, waxes, resins, sterols and non-volatile hydrocarbons. The DCM-extracted samples were air-dried and subsequently extracted with hot water to remove water-soluble components such as tannins, gums, sugars, starches, and coloring matter. Sample residues were air-dried and used for carbohydrate and lignin testing by liquid chromatography. No analyses were performed to assess the effectiveness of the extractions.

The compositional results obtained for two types of starting woody biomass and their corresponding ultra-low potassium congeners (the thrice washed materials), prepared according to the procedures given in Examples 14 and 15 (using $HNO_3$), are given in Table 13.

TABLE 13

(Main Compositional Breakdown for Biomass Feeds)

| Example | Biomass | Wash Cycles | Cellulose (wt %) | Hemi-cellulose (wt %) | Cellulose/Hemicellulose Weight Ratio (wt %/wt %) | Acid-Insoluble Lignin (wt %) | Unknown (including acid-soluble lignin) (wt %) |
|---|---|---|---|---|---|---|---|
| 14 | Loblolly pine | None | 39.3 | 22.3 | 1.76 | 28.5 | 9.9 |
| 14 | Loblolly pine | 3 | 36.3 | 20.6 | 1.76 | 29.8 | 13.3 |
| 15 | Ground hardwood pellets | None | 41.3 | 20.7 | 1.99 | 22.1 | 15.9 |
| 15 | Ground hardwood pellets | 3 | 42.8 | 22.0 | 1.95 | 23.8 | 11.4 |

The results in Table 13 demonstrate that the cellulose/hemicellulose weight ratio of the washed biomass feedstock is essentially unchanged from the starting precursor. This indicates that the method of the present invention does not selectively remove the more readily dissolved material (hemicellulose), and thus the resulting washed biomass will provide substantially the same yield of desirable products such as BTX in a catalytic fast pyrolysis process. The results demonstrate that the wash procedures of Examples 11 and 13 can produce a biomass feed from either a soft wood (pine) or hardwood that has both low K content, i.e. ≤25 ppm K, and little or no loss of cellulosics.

EXAMPLE 16

The experiment of Example 2 was repeated using hardwood that had been washed with DI water as in Example 3 except the ratio of DI wash water to biomass was 18:1 and the contacting time of each wash cycle was 30 minutes. Analysis of the washed and dried hardwood by ICP showed it contained 90 ppm K and 1200 ppm Ca. The reactor was charged with a fresh sample of 1500 g of the same catalyst and biomass was fed at 8.7 g/minute for 30 minutes. The experimental sequence of catalyzed fast pyrolysis and catalyst regeneration was repeated multiple times. The biomass feed rate was adjusted to approximately 8.7-10.0 g/minute during the succeeding experiments. The yield data for coke and char as a function of cycle number are presented in FIG. 5. The yield data for aromatics recovered are presented in FIG. 6.

After 50 cycles a sample of the used catalyst analyzed by ICP was shown to contain 1,240 ppm K, 5,660 ppm Ca, and 1,310 ppm Na.

The data in FIG. 5 demonstrate that the use of a washed biomass that contains lower concentrations of K and Ca produces less coke and char than when unwashed biomass is processed. The data in FIG. 6 show that washed biomass that contains lower concentrations of K and Ca deactivates the catalyst more slowly than when unwashed hardwood with higher concentrations of K and Ca is used. The analytical results for the catalyst used for 50 cycles of biomass upgrading show that a catalyst with 1,240 ppm K, 5,660 ppm Ca, and 1,310 ppm Na had lost approximately 5% yield (absolute) of aromatics and still provided about 20% carbon yield of aromatics.

EXAMPLE 17

The experiment of Example 2 was repeated using pine microchips that had been washed with acidified water in Example 8. The washed microchips were dry milled in either a knife mill using a 1 mm trapezoidal screen, or a hammer mill that used a ⅛ (3.2 mm) inch screen. After milling, particles larger than 14 mesh (1.4 mm) were removed using a sieve screen. The reactor was charged with a fresh sample of 1500 g of a catalyst that had 0.133 moles/kg Brønsted acid sites and washed, dry milled, and sieved biomass was fed at 13.3 g/minute for 30 minutes, and the catalyst was regenerated at 650° C. The experimental sequence of catalyzed fast pyrolysis and catalyst regeneration was repeated multiple times. The biomass feed rate was adjusted to approximately 8.5-11.0 g/minute during the succeeding experiments. The yield data for aromatics recovered are presented in FIG. 6.

The results presented in FIG. 6 show that pine microchips washed 3 times with acidified water at 70° C. leads to a lower rate of catalyst deactivation (0.0008% C/cycle) in a catalyzed pyrolysis process than a biomass feed washed 3 times with DI water at room temperature (0.0014% C/cycle) or a commercial cellulose feed (0.0012% C/cycle). The results in FIG. 6 demonstrate that a catalyst with Brønsted acid site density of only 0.133 may be operated with a low rate of catalyst deactivation when an ultra-low K biomass feed is the reactant.

EXAMPLE 18

Figure 7:
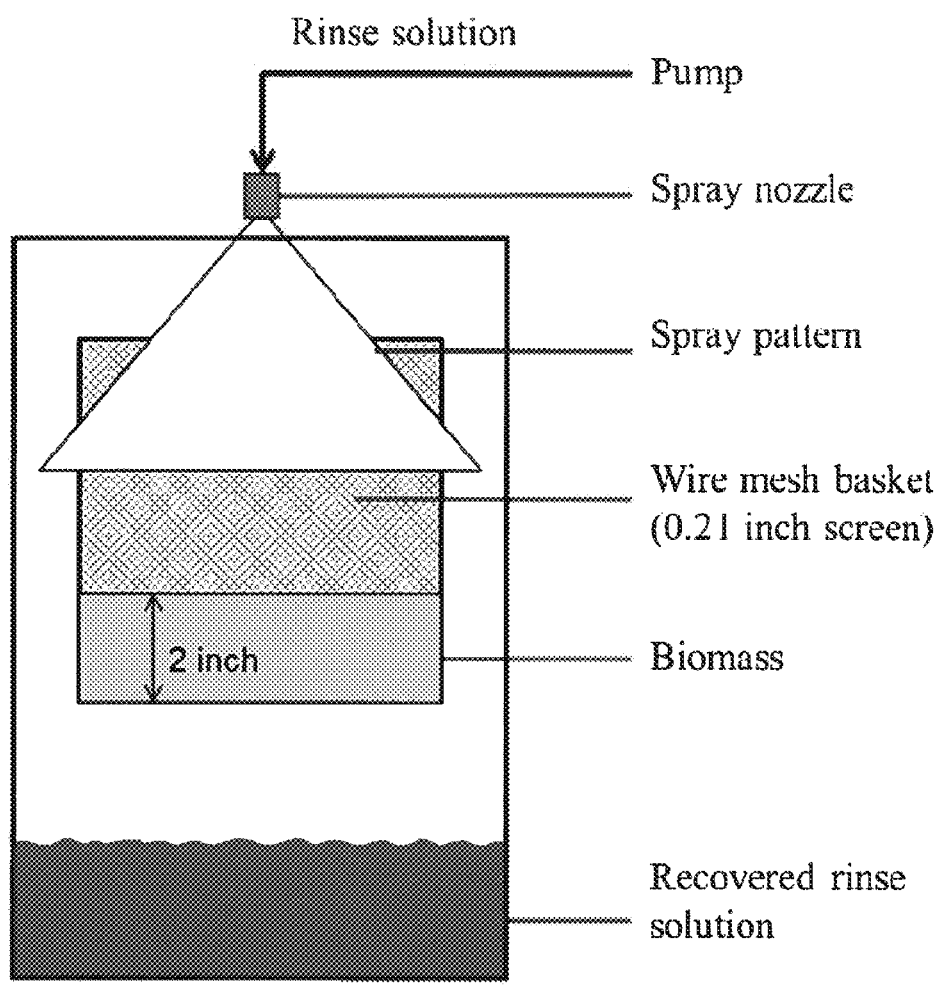
FIG. 7 depicts a spray rinse test apparatus.

A sample of 12 mm size particles of biomass that had been washed was filtered and loaded into a wire mesh basket as a mass of wet solids, i.e. without drying. The biomass contained 323 ppm of K. A spray nozzle was set up above the wire mesh basket to ensure that the rinse solution was evenly distributed over the biomass bed in the wire mesh basket as shown in FIG. 7. The flowrate of the rinse solution was controlled by a peristaltic pump connected to the spray nozzle. Typical biomass loading in the wire mesh basket was approximately 512 g (wet mass), and the solution flowrate through the spray nozzle was 440 g/min.

The rinse pump reservoir was filled with a used wash solution that contained 185 ppm K and 470 ppm Ca, and the solution was sprayed for 120 minutes at 24° C. and the concentration of the collected wash solution was monitored periodically. Samples of the biomass were removed at 1 minute intervals, dried, and analyzed by ICP for K and Ca; the results are summarized in Table 14. Samples of the collected rinse liquids were analyzed by ICP for K and Ca. After 10 minutes the K concentration of the collected rinse solution had risen to 198 ppm K, an increase of 13 ppm K, and after 120 minutes it had risen to 214 ppm K, an increase of 29 ppm K. After 10 minutes the Ca concentration of the collected rinse solution had risen to 485 ppm Ca, an increase of 15 ppm Ca, and after 120 minutes it had risen to 505 ppm Ca, an increase of 29 ppm Ca.

The results of Example 18 demonstrate that AAEMs such as K and Ca can be removed by a rinse that contains K and Ca therein. This demonstrates that a wash solution that has been used to extract AAEMs such as K and Ca can be re-used as a rinse solution to remove further K and Ca from washed biomass.

EXAMPLE 19

The experiment of Example 18 was repeated with a fresh sample of wet washed wood having 323 ppm K, except the temperature of the wash was set at 80° C. Samples of the wood were removed every minute. Table 14 shows the data for the wood that was rinsed at 80° C. along with that rinsed at 24° C. from Example 18. The data in Table 14 demonstrate that a warm (80° C.) rinse solution removes more K than a cool (24° C.) rinse solution.

TABLE 14

(Potassium Content (ppm) of Rinsed Wood)

| Rinse Temp | Time of rinsing, minutes | | | | |
|---|---|---|---|---|---|
| ° C. | 0 | 1 | 2 | 3 | 4 |
| 24 | 323 | 305 | 276 | 312 | 274 |
| 80 | 323 | 304 | 269 | 266 | 222 |

EXAMPLE 20

The experiment of Example 18 was repeated in separate experiments on three different size fractions (12 mm, 10 mm, 5 mm) of washed biomass (323, 313, 454 ppm K, respectively), except DI water was used as the rinse solution. Samples of the biomass were taken as before at one minute intervals, dried, and analyzed by ICP. After 5 minutes the 12 mm sample contained 13% less K, the 10 mm sample contained 25% less K, and the 5 mm sample contained 75% less K.

The results of Example 20 show that rinsing the washed biomass with DI water can remove significant amounts of the potassium remaining in the biomass. This demonstrates that the rinse of smaller particle size biomass with DI water is more effective than for larger particles.

EXAMPLE 21

The experiment of Example 20 was repeated using a sample of the 12 mm washed biomass (323 ppm K) and dilute $HNO_3$ as the rinse solution in place of DI water. Samples of the rinsed biomass were taken at one minute intervals, dried, and analyzed as before. The sample of biomass rinsed for 3 minutes with dilute $HNO_3$ contained 131 ppm of K whereas the sample rinsed with DI water for 3 minutes contained 282 ppm K. The results of Example 21 demonstrate that the rinse of washed biomass with dilute $HNO_3$ removes more K than a rinse with DI water.

EXAMPLE 22

Recently cut Loblolly pine wood pieces were reduced in size in a commercial hammer mill (Schutte Buffalo Hammer Mill model 1320) fitted with a screen with 1.25 inch (31.7 mm) holes. The material was dried at 105° C. overnight. A sample of the material was sieved to obtain a particle size distribution that is presented in Table 15.

TABLE 15

| | Mass fraction, % | | | | | | | |
|---|---|---|---|---|---|---|---|---|
| Size range (microns) | 2800-3500 | 2360-2800 | 1400-2360 | 850-1400 | 425-850 | 300-425 | 70-300 | <70 |
| Wet hammer-milled chips | 45.4 | 10.1 | 26.2 | 11.9 | 5 | 0.7 | 0.6 | 0.1 |

Commercially hammer milled loblolly pine wood pieces were treated in a digester as in Example 8. The hammer-milled chips were washed at 70° C. with a solution to biomass ratio of 10:1 for 40 minutes, separated from the solution, and returned to the wash tank. These steps were repeated 3 times. After dilute acid washing, the treated biomass was discharged into a blow tank and rinsed with DI water using an overhead shower for 15-30 minutes with a flow rate of approximately 20 gal/min (75 l/min).

EXAMPLE 23

The procedure of Example 22 was repeated with a fresh sample of hammer milled biomass except the dilute acid washing step was repeated two times.

The treated biomass samples from Examples 22 and 23 were dried overnight and analyzed by ICP. The results are collected in Table 16.

TABLE 16

| | Untreated | Example 22 | Example 23 |
|---|---|---|---|
| Chip size | | Wet Hammer-milled chips | Wet Hammer-milled chips |
| Temperature (° C.) | | 70 | 70 |
| Water to biomass mass ratio | | 10:1 | 10:1 |
| Wash cycles | | 3 | 2 |
| K (ppm) | 510 | 34 | 42 |
| Ca(ppm) | 503 | 42 | 45 |
| Na (ppm) | 30 | 36 | 38 |

The results in Table 15 and Table 16 show that hammer milling of biomass material is sufficient to reduce the size of the biomass particles and prepare it for washing with dilute acid to achieve a low potassium and low calcium biomass without significantly increasing sodium content.

EXAMPLE 24

Loblolly pine that had first been sized into standard mill chips was sheared in a wood chip refiner. The procedure of Example 8 was repeated using this sheared loblolly pine shaped like matchsticks having aspect ratios from about 3 to 20 or more (typically approximately 0.125×0.125×1.0 inches, 3.2×3.2×25.4 mm, aspect ratio 8) with two washing steps of 40 minutes each at 70° C. using a wash solution: biomass mass ratio of 16:1 and a wash solution of pH 2.5 (0.04 wt % nitric acid). The washed material was rinsed with DI water, and dried at 105° C. overnight. A sample was analyzed by ICP.

EXAMPLE 25

The procedure of Example 24 was repeated with a fresh sample of sheared loblolly pine except a portion of the wash solution was continuously removed and replaced by a similar size sample of fresh solution for 160 minutes. Over the course of the 160 minute treatment the total amount of fresh wash solution added was approximately two times the initial volume of wash solution. The washed material was rinsed with DI water, and dried at 105° C. overnight. A sample was analyzed by ICP.

The results of Examples 24 and 25 are collected in Table 17. The results in Table 17 show that 2 cycles of acid washing removes at least 95% of K and Ca and that continuous replacement of wash solution reduces K by 98% and Ca content by 96%, and the continuous replacement washing removes at least as much K and Ca as does a two cycle wash procedure. Furthermore, the contamination of the biomass by Na was kept to a low level. The results in Table 17 show that the first comminution step followed by the washing step is able to produce biomass sized to provide excellent removal of K and Ca. The results also show that K and Ca can be removed very effectively from biomass with a high aspect ratio.

TABLE 17

|  | Untreated Material | Example 24 | Example 25 |
|---|---|---|---|
| Temperature ° C. | — | 70 | 70 |
| Rinse cycles | — | 2 | 1 Continuous replacement |
| Time per cycle, minutes | — | 40 | 160 |
| pH | — | 2.5 | 2.5 |
| Wash Solution:Biomass mass ratio (wt/wt) | — | 16 | 16 |
| K (ppm) (% removal) | 649 | 25 (96) | 14 (98) |
| Ca (ppm) (% removal) | 632 | 31 (95) | 26 (96) |
| Na (ppm) (% removal) | 31 | 44 (−42) | 40 (−29) |

EXAMPLE 26

Loblolly pine that had been sized in a first sizing step to provide microchips was used for this Example. A sample was treated as in Example 8, i.e. 3 wash cycles at 70° C., and rinse with DI water. The untreated and treated materials were comminuted in an identical manner in a hammer mill fitted with a 3/32 inch (2.4 mm) screen. The particle size distributions as determined by laser diffraction of the two materials are summarized in Table 18. The parameters (i.e. D(10), D(50), etc.) are the diameters which, when all particles in a sample are arranged in order of ascending size, divides the sample's particle sizes into specified percentages. The percentage of particles below the diameter of interest is the number expressed after the "D", i.e. D(10)= 145 means 10% of the particles are less than or equal to 145 microns. A smaller value for D(10) describes a particle size distribution with smaller particles.

The results in Table 18 demonstrate that comminution of a biomass sample that has been treated to remove AAEMs by washing with dilute acid achieves more material of a smaller particle size than does comminution of an untreated biomass sample. This shows that a washing step that precedes the sizing step improves the sizing step.

TABLE 18

| Sample | Unwashed | Washed |
|---|---|---|
| Particle Size Distribution | Volume % | |
| <63 μm | 3.6% | 14.1% |
| 63-250 μm | 15.5% | 32.6% |
| 250-425 μm | 17.3% | 21.3% |
| 425-850 μm | 36.1% | 24.7% |
| 850-1,400 μm | 21.4% | 6.8% |
| >1,400 μm | 6.2% | 0.5% |
| Distribution Parameters | microns | |
| D(10) | 145 | 45 |
| D(50) | 556 | 273 |
| D(90) | 1239 | 767 |
| D(99) | 1911 | 1270 |
| D(100) | 2690 | 1830 |

All patents, patent applications, test procedures, priority documents, articles, publications, manuals, and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. An improved catalytic fast pyrolysis process comprising steps of:
    a) treating biomass containing alkali and alkaline earth metal components to reduce alkali and alkaline earth metal content to result in treated biomass,
    b) feeding the treated biomass of step a), catalyst composition, and transport fluid to a catalytic fast pyrolysis process fluidized bed reactor maintained at reaction conditions to manufacture a raw fluid product stream,
    c) feeding the raw fluid product stream of step b) to a solids separation and stripping system to produce separated solids and a fluid product stream,
    d) feeding the fluid product stream of step c) to a vapor/liquid separation system to produce a liquid phase stream comprising water and components selected from the group consisting of char, coke, ash, catalyst fines, water soluble organics and heavy organics, and combinations thereof, and a vapor phase stream comprising benzene, toluene xylenes, olefins having carbon numbers of 2 to 4, methane, carbon monoxide, and carbon dioxide, and
    e) feeding the vapor phase stream of step d) to a product recovery system to recover benzene, toluene, xylenes and, optionally, olefins.

2. The process of claim 1 wherein step a) comprises steps 1) sizing the biomass to ≤20 cm size particles, 2) washing the sized biomass of step 1) in at least one washing cycle with a washing fluid sufficiently to reduce the content of alkali and alkaline earth metals, 3) optionally rinsing the washed biomass of step 2) with rinsing fluid, 4) drying the biomass to reduce water content, and optionally 5) sizing the dried biomass to ≤1 cm size particles.

3. The process of claim 2 wherein the washed biomass of step 2) comprises ≤50 ppm potassium, or ≤100 ppm calcium, or both.

4. The process of claim 2 wherein the biomass particles resulting from sizing step 1) or sizing step 5) have a size of from 0.005 to 1 cm.

5. The process of claim 2 wherein the washing fluid of step 2) is selected from the group consisting of acidified water, alkaline water, and combinations thereof.

6. The process of claim 5 wherein the washing fluid of step 2) comprises acidified water with pH greater than 2.0 but no more than 5.0.

7. The process of claim 2 wherein the washing fluid of step 2) comprises water recovered from the liquid phase stream of step d) and/or water recovered from the drying step 4).

8. The process of claim 2 wherein the washing fluid of step 2) comprises water obtained from municipal supply, river, or freshwater lake, wherein the total concentration of Ca, Mg, K, and Na of the washing fluid is ≤181 ppm.

9. The process of claim 2 wherein the washing fluid of step 2) comprises an aqueous solution of organic acids or mineral acids selected from the group consisting of acetic acid, formic acid, nitric acid, carbonic acid, other carboxylic acids, sulfuric acid, phosphoric acid, or hydrochloric acid, ammonium salt, alkyl ammonium salt, aryl ammonium salt, ethylene glycol, glycerol, carbon dioxide, or ammonia, or combinations thereof.

10. The process of claim 2 wherein a particle size distribution of at least 50% of the sized biomass of step 1) is from 1 to 1400 microns as measured by laser diffraction.

11. The process of claim 2 wherein an average aspect ratio of the particles of the sized biomass of step 1) is from 1.1 to at least 40.

12. The process of claim 2 wherein an average aspect ratio of the particles of the sized biomass of step 1) is from 3 to 20.

13. The process of claim 2 wherein washing step 2) is ≤120 minutes.

14. The process of claim 2 wherein washing step 2) comprises 2 or more washing cycles, each cycle for ≤60 minutes.

15. The process of claim 14 wherein the washing fluid of each subsequent washing cycle has a pH greater than or equal to the pH of the washing fluid of the preceding washing cycle.

16. The process of claim 2 wherein a sum of all contacting times for all washing cycles is ≤120 minutes.

17. The process of claim 2 wherein a cellulose/hemicellulose ratio in the washed biomass of step 2) is changed from a cellulose/hemicellulose ratio in the sized biomass of step 1) by no more than 10%.

18. The process of claim 2 wherein a cellulose/hemicellulose ratio in the washed biomass of step 2) changes by no more than 10% from a cellulose/hemicellulose ratio of the unwashed biomass.

19. The process of claim 2 wherein a percent of organic matter lost from the biomass of step a) is less than 5% as measured by chemical oxygen demand of the washing and rinsing fluids.

20. The process of claim 2 wherein the rinsing fluid of step 3) comprises acidic water.

21. The process of claim 2 wherein the rinsing fluid of step 3) comprises water which comprises ≤5 ppm potassium or ≤20 ppm calcium, or both.

22. The process of claim 2 wherein the rinsing fluid of step 3) comprises water which is produced by distillation, or by reverse osmosis, or ion exchange, or is de-ionized, or any combination thereof.

23. The process of claim 22 wherein the rinsing fluid comprises deionized water and is re-cycled to step 3).

24. The process of claim 2 wherein the washing fluid of step 2) comprises water, which after use in washing step 2) is used in a heat exchanger to heat fresh washing fluid.

25. The process of claim 2 wherein a contacting time of rinsing step 3) is ≤30 minutes.

26. The process of claim 2 wherein a total elapsed time of washing step 2) and rinsing step 3) is ≤10 hours.

27. The process of claim 2 wherein a mass ratio of washing fluid to biomass in step 2) is at least 3.

28. The process of claim 2 wherein the sized biomass of step 1) is fed to step 2) as a batch, semi-continuously, or continuously.

29. The process of claim 2 wherein the washing fluid is fed to step 2) as a batch, semi-continuously, or continuously.

30. The process of claim 2 wherein the washing fluid of step 2) comprises water, is recovered following step 2) and is used as irrigation water.

31. The process of claim 1 wherein the biomass to be treated in step a) is comminuted to result in particles of from 0.42 to 12.7 mm in size, or the biomass that has been treated in step a) is comminuted to result in particles of from 0.42 to 12.7 mm in size, or both the biomass to be and having been treated in step a) are comminuted to result in particles of from 0.42 to 12.7 mm in size.

32. The process of claim 1 wherein a sum of recovered benzene, toluene and xylenes of step e) are at least 10% yield based on carbon in the treated biomass fed to step b).

33. The process of claim 1 wherein the catalyst composition of step b) comprises a crystalline molecular sieve characterized by a silica/alumina mole ratio greater than 5 and a Constraint Index from 1 to 12.

34. The process of claim 1 wherein the fluidized bed reaction conditions of step b) include a temperature of from 300 to 1000° C. and pressure from 100 to 1500 kPa.

35. The process of claim 1 wherein the catalyst composition of step b) comprises a crystalline molecular sieve having the structure of ZSM-5, ZSM-11, ZSM-12, ZSM-22, ZSM-23, ZSM-35, ZSM-48, ZSM-50, zeolite beta, mordenite, ferrierite, or combinations thereof.

36. The process of claim 1 wherein the catalyst composition of step b) comprises a crystalline molecular sieve having the structure of ZSM-5.

37. The process of claim 1 wherein from about 5 to about 99% of the recovered toluene or olefins of step e) is recycled to the fluidized bed reactor of step b).

38. The process of claim 1 wherein at least 35% of the alkali and alkaline earth metals in the biomass containing alkali and alkaline earth metal components are removed in treating step a).

39. The process of claim 1 wherein at least 50% of potassium and at least 20% of calcium in the biomass containing alkali and alkaline earth metal components are removed in treating step a).

40. The process of claim 1 wherein at least 35% of chlorine, at least 5% of sulfur and at least 5% of nitrogen in the biomass containing alkali and alkaline earth metal components are removed in treating step a).

41. The process of claim 1 wherein at least a portion of the catalyst composition is removed from the reactor of step b) and regenerated in an oxidation process to produce regenerated catalyst composition, and the regenerated catalyst composition is returned to the fluidized bed reactor of step b).

42. The process of claim 41 wherein at least a portion of the catalyst composition removed from the reactor of step b) is washed with washing fluid to remove alkali and alkaline earth metals therefrom prior to being returned to the fluidized bed reactor of step b).

43. The process of claim 1 wherein at least 90% of the alkali and alkaline earth metals in the biomass containing alkali and alkaline earth metal components are removed in step a).

44. The process of claim 1 wherein at least 95% of potassium and at least 90% of calcium in the biomass containing alkali and alkaline earth metal components are removed in step a).

45. The process of claim 1 wherein at least a portion of the catalyst composition is removed from the reactor of step b) and regenerated in an oxidation process to produce regenerated catalyst composition, and the regenerated catalyst composition is returned to the fluidized bed reactor of step b) along with fresh catalyst composition, wherein an average Brønsted acid site density of the catalyst composition removed from the reactor is no less than 75% of a Brønsted acid site density of the fresh catalyst as measured by isopropyl amine adsorption.

46. The process of claim 1 wherein an average concentration of Na plus K in the catalyst composition in the reactor of step b) is less than 0.1 moles per kg of catalyst.

47. The process of claim 1 wherein an average concentration of Na plus K in the catalyst composition in the reactor of step 2) is less than 3000 ppm.

48. The process of claim 1 wherein the treated biomass of step a) comprises ≤50 ppm potassium, or ≤100 ppm calcium, or both.

49. An improved catalytic fast pyrolysis process comprising steps of:
   a) treating biomass containing at least 500 ppm alkali and alkaline earth metal components to reduce alkali and alkaline earth metal content to result in treated biomass by a method comprising steps 1) sizing the biomass to ≤20 cm size particles, 2) washing the sized biomass of step 1) in at least one washing cycle with a washing fluid sufficiently to reduce the content of alkali and alkaline earth metals, including a mass ratio of washing fluid to biomass of at least 5, 3) optionally rinsing the washed biomass of step 2) with rinsing fluid, 4) drying the biomass to reduce water content, and optionally 5) sizing the dried biomass particle size to ≤1 cm,
   b) feeding the treated biomass of step a), catalyst composition comprising a crystalline molecular sieve having the structure of ZSM-5, and transport fluid to a catalytic fast pyrolysis process fluidized bed reactor maintained at reaction conditions including a temperature from 300 to 1000° C., pressure from 100 to 1500 kPa and catalyst- to- biomass mass ratio of from 0.1 and 40 to manufacture a raw fluid product stream,
   c) feeding the raw fluid product stream of step b) to a solids separation and stripping system to produce separated solids and a fluid product stream,
   d) feeding the fluid product stream of step c) to a vapor/liquid separation system to produce a liquid phase stream comprising water and components selected from the group consisting of char, coke, ash, catalyst fines, water soluble organics and heavy organics, and combinations thereof, and a vapor phase stream comprising benzene, toluene and xylenes, and
   e) feeding the vapor phase stream of step d) to a product recovery system to recover benzene, toluene and xylenes.

50. The process of claim 49 wherein the biomass particles resulting from sizing step 1) or step 5) have a size of from 0.005 to 1.0 cm.

51. The process of claim 49 wherein the washing fluid of step 2) is selected from the group consisting of acidified water, alkaline water, and combinations thereof.

52. The process of claim 49 wherein the washing fluid of step 2) comprises water recovered from the liquid phase stream of step d) and/or water recovered from the drying step 4).

53. The process of claim 49 wherein the rinsing fluid of step 3) comprises water which is produced by distillation, or by reverse osmosis, or ion exchange, or is de-ionized, or any combination thereof.

54. The process of claim 49 wherein the washing fluid of step 2) comprises an aqueous solution of organic acids or mineral acids selected from the group consisting of acetic acid, formic acid, nitric acid, carbonic acid, other carboxylic acids, sulfuric acid, phosphoric acid, or hydrochloric acid, ammonium salt, alkyl ammonium salt, aryl ammonium salt, ethylene glycol, glycerol, carbon dioxide, or ammonia, or combinations thereof.

55. The process of claim 49 wherein the biomass treated in step a) and/or the treated biomass of step a) are comminuted to result in particles of from 0.42 to 12.7 mm in size.

56. The process of claim 49 wherein at least 35% of the alkali and alkaline earth metals in the biomass containing alkali and alkaline earth metal components are removed in treating step a).

57. The process of claim 49 wherein at least 50% of potassium and at least 20% of calcium in the biomass containing alkali and alkaline earth metal components are removed in treating step a).

58. The process of claim 49 wherein at least 35% of chlorine, at least 5% of sulfur and at least 5% of nitrogen in the biomass containing alkali and alkaline earth metal components are removed in treating step a).

59. The process of claim 49 wherein the treated biomass of step a) comprises less than 15,000 ppm alkali and alkaline earth metal components.

60. The process of claim 49 wherein the biomass containing alkali and alkaline earth metal components of step a) comprises at least 500 ppm chlorine, at least 500 ppm sulfur, at least 0.5% nitrogen, or a combination thereof, and the treated biomass of step a) comprises less than less than 500 ppm chlorine, less than 500 ppm sulfur, less than 0.5% nitrogen, or a combination thereof.

61. The process of claim 49 wherein the treated biomass of step a) comprises less than 250 ppm of chlorine, less than 200 ppm of sulfur, less than 0.2% by weight of nitrogen, or a combination thereof.

* * * * *